United States Patent
Ishikura

(10) Patent No.: US 8,531,705 B2
(45) Date of Patent: Sep. 10, 2013

(54) IMAGE PROCESSING APPARATUS AND IMAGE PROCESSING SYSTEM

(75) Inventor: Kaoru Ishikura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 386 days.

(21) Appl. No.: 12/938,441

(22) Filed: Nov. 3, 2010

(65) Prior Publication Data

US 2011/0109935 A1    May 12, 2011

(30) Foreign Application Priority Data

Nov. 12, 2009   (JP) .................................. 2009-259213
Oct. 28, 2010   (JP) .................................. 2010-242136

(51) Int. Cl.
*G06F 15/00* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

| | | | |
|---|---|---|---|
| 7,603,189 B2 | 10/2009 | Tanaka et al. | |
| 2004/0239713 A1* | 12/2004 | Kang | 347/19 |
| 2006/0290680 A1 | 12/2006 | Tanaka et al. | |
| 2009/0080023 A1 | 3/2009 | Watabe | |
| 2009/0237725 A1 | 9/2009 | Hamaguchi | |
| 2009/0257083 A1 | 10/2009 | Ishikura | |

FOREIGN PATENT DOCUMENTS

| | | |
|---|---|---|
| CN | 1474523 A | 2/2004 |
| CN | 101557450 A | 10/2009 |
| JP | 08-307588 | 11/1996 |
| JP | 2002-144684 | 5/2002 |
| JP | 2004-072563 | 3/2004 |
| JP | 2007-043647 | 2/2007 |
| JP | 2009-077193 | 4/2009 |
| JP | 2009-225316 A | 10/2009 |

* cited by examiner

*Primary Examiner* — Saeid Ebrahimi Dehkordy
(74) *Attorney, Agent, or Firm* — Renner, Otto, Boisselle & Sklar, LLP

(57) ABSTRACT

An image processing apparatus according to one embodiment of the present invention is communicably connected to an image monitoring apparatus, and can be remotely operated from the image monitoring apparatus. The image processing apparatus includes a display unit that is configured so that display content can be synchronized with a display unit of the image monitoring apparatus, and displays a trouble message when trouble occurs in the image processing apparatus. When the image processing apparatus is remotely operated while the display unit of the image processing apparatus is displaying the trouble message, simulation information is transmitted to the image monitoring apparatus such that the simulation information is displayed only on the display unit of the image monitoring apparatus, and display of the trouble message on the display unit of the image processing apparatus is continued.

8 Claims, 18 Drawing Sheets image forming apparatus side image monitoring apparatus side

IMAGE PROCESSING APPARATUS AND IMAGE PROCESSING SYSTEM

CROSS-REFERENCE TO RELATED APPLICATIONS

This application claims priority under 35 U.S.C. §119(a) on Patent Application No. 2009-259213 filed in Japan on Nov. 12, 2009 and Patent Application No. 2010-242136 filed in Japan on Oct. 28, 2010, the entire contents of which are herein incorporated by reference.

BACKGROUND OF THE INVENTION

1. Field of the Invention

The present invention relates to an image processing apparatus and an image processing system.

2. Description of the Related Art

Among image processing apparatuses configured as a multifunction device provided with image processing functions of copying, printing, faxing, scanning, and so forth, there are image processing apparatuses that are communicably connected to an information processing apparatus such as another image processing apparatus or a personal computer (below, referred to as a "PC").

For example, JP H8-307588A (referred to below as Patent Document 1) discloses an image forming system in which a plurality of image processing apparatuses are connected via a connection/control apparatus, and using an operation unit and a display unit of one image processing apparatus it is made possible to remotely operate another image processing apparatus.

According to the technology described in Patent Document 1, it is possible to use a nearby image processing apparatus to remotely operate another image processing apparatus that is in a distant location. More specifically, it is possible to copy and output an image that has been read with the nearby image processing apparatus with another image processing apparatus that is in a distant location.

However, with the technology disclosed in Patent Document 1, if trouble occurs in the image processing apparatus in a distant location, information regarding that trouble cannot be displayed in the display unit of the nearby image processing apparatus. Therefore, when trouble has occurred in the image processing apparatus in a distant location, ordinarily a manager is required to travel to the location where that image processing apparatus is installed in order to confirm the content of the trouble.

SUMMARY OF THE INVENTION

The present invention was made in consideration of such circumstances, and it is an object thereof to provide an image processing apparatus and an image processing system in which when trouble has occurred in the image processing apparatus, information regarding that trouble can be displayed in an image monitoring apparatus that has been connected to that image processing apparatus.

The image processing apparatus according to the present invention is an image processing apparatus that is communicably connected to an image monitoring apparatus, and can be remotely operated from the image monitoring apparatus, the image processing apparatus including a display unit that is configured so that display content can be synchronized with a display unit of the image monitoring apparatus, and displays a trouble message informing that trouble has occurred when trouble occurs in the image processing apparatus, in which when remote operation is performed from the monitoring apparatus while the display unit of the image processing apparatus is displaying the trouble message, simulation information related to the trouble corresponding to the content of the remote operation is transmitted to the image monitoring apparatus such that the simulation information is displayed only on the display unit of the image monitoring apparatus, and display of the trouble message on the display unit of the image processing apparatus is continued.

According to the image processing apparatus of the present invention, the display content of the display unit of the image processing apparatus can be synchronized with the display content of the display unit of the image monitoring apparatus, so the state of operation of the image processing apparatus can be monitored with the image monitoring apparatus in a location distant from the image processing apparatus. Also, the image processing apparatus can be remotely operated from the image monitoring apparatus, so it is possible to easily operate the image processing apparatus from the image monitoring apparatus in a location distant from the image processing apparatus. Furthermore, even when operation of the image processing apparatus is difficult for a user, if the image monitoring apparatus is configured with an information processing apparatus such as a PC, it is possible to operate the image processing apparatus using this image monitoring apparatus.

When trouble occurs in the image processing apparatus, a trouble message is displayed in the display unit of the image processing apparatus, and this trouble message display is continued even if remote operation is performed from the image monitoring apparatus. Simulation information related to the trouble corresponding to the content of the remote operation is displayed only on the display unit of the image monitoring apparatus, and is not displayed on the display unit of the image processing apparatus. Therefore, it is possible to prevent mistaken operation by a user of the image processing apparatus who is not authorized to respond to trouble, and even in the case of a user of the image processing apparatus who is not authorized to respond to trouble, it is possible to confirm that trouble is occurring in that image processing apparatus from the trouble message displayed on the display unit of the image processing apparatus. In the description below, a user of the image processing apparatus who is not authorized to respond to trouble is referred to as a "user", and a user of the image processing apparatus and the image monitoring apparatus who belongs to a dealer or the like and is authorized to respond to trouble is referred to as "service staff". In the present invention, simulation information is information necessary for responding to trouble.

Here, an example of a "trouble message" is a message informing that trouble has occurred, such as "Please contact a dealer. Trouble code (F3-12)".

In the image processing apparatus according to the present invention, a configuration may be adopted in which when remote operation is performed from the image monitoring apparatus while the display unit of the image processing apparatus is displaying the trouble message, the display unit of the image processing apparatus displays the trouble message and a remote operation message informing that remote operation is being performed.

Here, an example of a "remote operation message" is a message informing that remote operation is being performed, such as "Under remote operation. Please do not turn off the power."

In this case, when the image processing apparatus is remotely operated while trouble is occurring, a remote operation message is displayed together with a trouble message on the display unit of the image processing apparatus, so it is possible to prevent the user from mistakenly turning off power of the image processing apparatus during remote operation.

The image processing system according to the present invention is an image processing system provided with an image processing apparatus and an image monitoring apparatus that is communicably connected to the image processing apparatus, in which the image processing apparatus can be remotely operated from the image monitoring apparatus; the image processing apparatus including a display unit that displays a trouble message informing that trouble has occurred when trouble occurs; and the image monitoring apparatus including a display unit that is configured so that display content can be synchronized with the display unit of the image processing apparatus, and when trouble occurs in the image processing apparatus, displays a trouble message having the same content as the trouble message displayed by the display unit of the image processing apparatus; in which when the image processing apparatus is remotely operated from the image monitoring apparatus while the display units of the image processing apparatus and the image monitoring apparatus are displaying the trouble messages, simulation information related to the trouble corresponding to the content of the remote operation is displayed only on the display unit of the image monitoring apparatus, and display of the trouble message on the display unit of the image processing apparatus is continued.

According to the image processing system of the present invention, display content can be synchronized between the display unit of the image processing apparatus and the display unit of the image monitoring apparatus, so the state of operation of the image processing apparatus can be monitored with the image monitoring apparatus in a location distant from the image processing apparatus. Also, the image processing apparatus can be remotely operated from the image monitoring apparatus, so it is possible to easily operate the image processing apparatus from the image monitoring apparatus in a location distant from the image processing apparatus. Furthermore, even when operation of the image processing apparatus is difficult for a user, if the image monitoring apparatus is configured with an information processing apparatus such as a PC, it is possible to operate the image processing apparatus using this image monitoring apparatus.

When trouble occurs in the image processing apparatus, a trouble message is displayed in the display units of the image processing apparatus and the image monitoring apparatus. If the image processing apparatus is remotely operated from the image monitoring apparatus in this state, simulation information related to the trouble corresponding to the content of the remote operation is displayed only on the display unit of the image monitoring apparatus, and display of the trouble message is continued on the display unit of the image processing apparatus. Therefore, when the image processing apparatus is remotely operated while trouble is occurring in the image processing apparatus, it is possible to prevent mistaken operation by a user. In addition, remote operation from the image monitoring apparatus is possible in a state in which a trouble message is being displayed on the display unit of the image processing apparatus, so the service staff, while having the user identify that trouble is occurring, can confirm the operational state of the image processing apparatus from the simulation information displayed in the image monitoring apparatus. Therefore, depending on the operational state of the image processing apparatus, it is possible to prompt the user to perform a trouble resolving operation (cause the user to perform such an operation). Also, the service staff that responds to the trouble can travel to the user site after becoming aware of the operational state of the image processing apparatus, so the time until trouble is resolved can be shortened.

Here, an example of a "trouble message" is a message informing that trouble has occurred, such as "Please contact a dealer. Trouble code (F3-12)".

In the above image processing system according to the present invention, a configuration may be adopted in which when the image processing apparatus is remotely operated from the image monitoring apparatus while the display unit of the image processing apparatus is displaying the trouble message, the display unit of the image processing apparatus displays the trouble message and a remote operation message informing that remote operation is being performed.

Here, an example of a "remote operation message" is a message informing that remote operation is being performed, such as "Under remote operation. Please do not turn off the power."

In this case, when the image processing apparatus is remotely operated from the image monitoring apparatus while trouble is occurring, a remote operation message is displayed together with a trouble message on the display unit of the image processing apparatus, so it is possible to prevent the user from mistakenly turning off power of the image processing apparatus during remote operation.

In the above image processing system according to the present invention, a configuration may be adopted in which when the image processing apparatus is remotely operated from the image monitoring apparatus while the display unit of the image monitoring apparatus is displaying the trouble message, the display unit of the image monitoring apparatus displays the simulation information and the trouble message.

In this case, on the image monitoring apparatus side, simulation information related to the trouble in the image processing apparatus is displayed on the same screen as the trouble message, so it is possible to compare the content of the simulation information to the content of the trouble message.

BRIEF DESCRIPTION OF THE DRAWINGS

FIG. 3A is a flowchart that shows the flow of screen display operation on the side of the image forming apparatus, and FIG. 3B is a flowchart that shows the flow of screen display operation on the side of an image monitoring apparatus.

FIG. 6A is a flowchart that shows the flow of screen display operation on the image forming apparatus side, and FIG. 6B is a flowchart that shows the flow of screen display operation on the image monitoring apparatus side.

FIG. 11A is a flowchart that shows the flow of screen display operation on the image forming apparatus side, and FIG. 11B is a flowchart that shows the flow of screen display operation on the image monitoring apparatus side.

FIG. 14A is a flowchart that shows the flow of screen display operation on the side of the image forming apparatus, and FIG. 14B is a flowchart that shows the flow of screen display operation on the side of an image monitoring apparatus.

DESCRIPTION OF THE PREFERRED EMBODIMENTS

Hereinafter, embodiments of the present invention will be described in detail with reference to the attached drawings. In the below description and the drawings attached to this specification, the same reference symbols are assigned to the same functional components. The names and functions of those components are also the same. Accordingly, a description of those functional components is not repeated.

First Embodiment

<Configuration>

Figure 1:
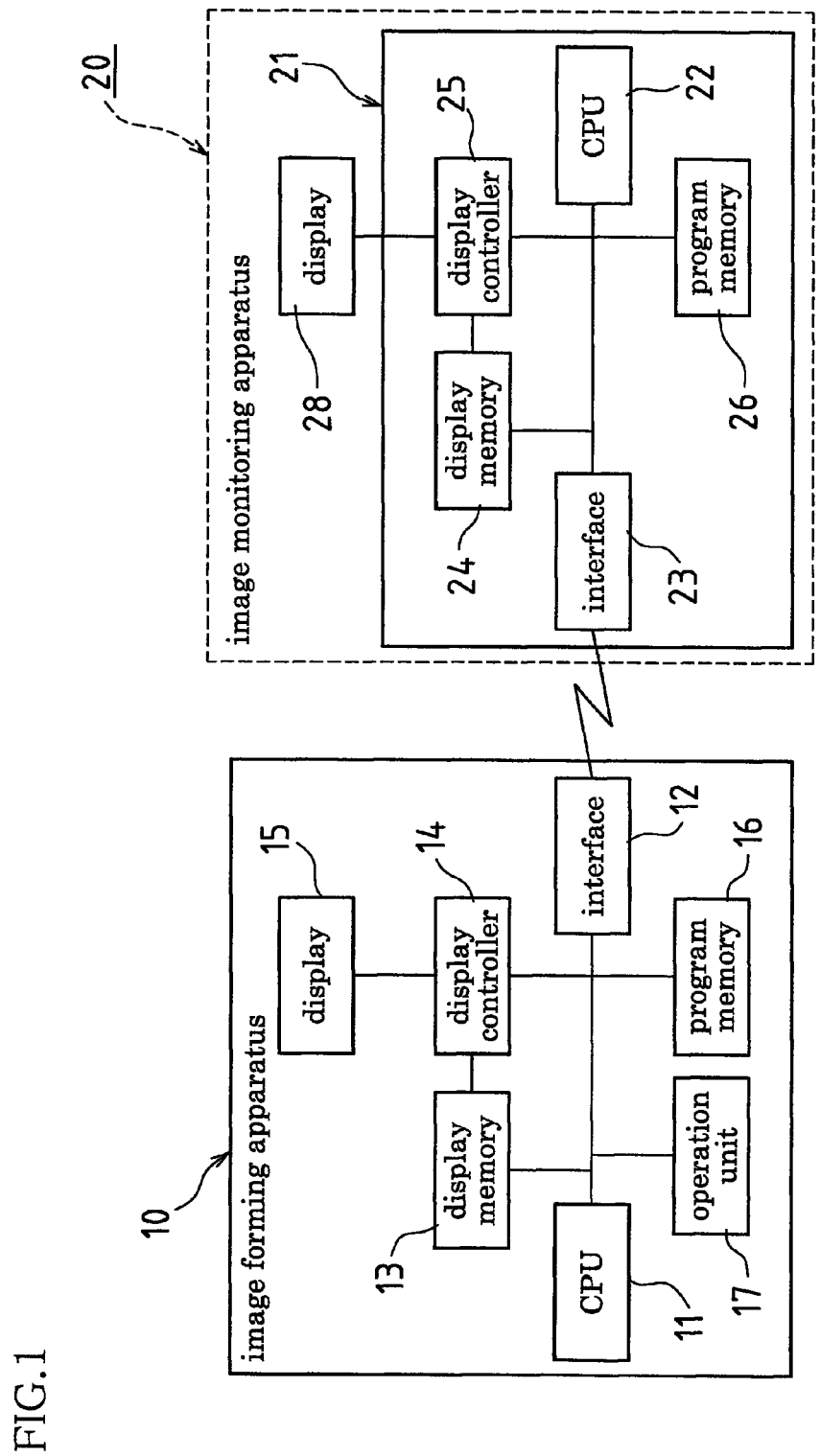
FIG. 1 is a block diagram that shows the configuration of an image processing system according to a first embodiment.

FIG. 1 is a block diagram that shows the configuration of an image processing system according to a first embodiment of the present invention.

As shown in FIG. 1, the image processing system of the present embodiment is configured with an image forming apparatus 10 having image forming functions such as copying, printing, faxing, and scanning, and an image monitoring apparatus 20 that is connected to the image forming apparatus 10. The image forming apparatus 10 corresponds to the image processing apparatus of the present invention.

The connection of the image forming apparatus 10 and the image monitoring apparatus 20 may be a connection by a single communications cable or the like, or a connection using communications lines of a LAN (Local Area Network) or the internet, or a connection in which a plurality of communications methods are used together, for example.

Figure 2:
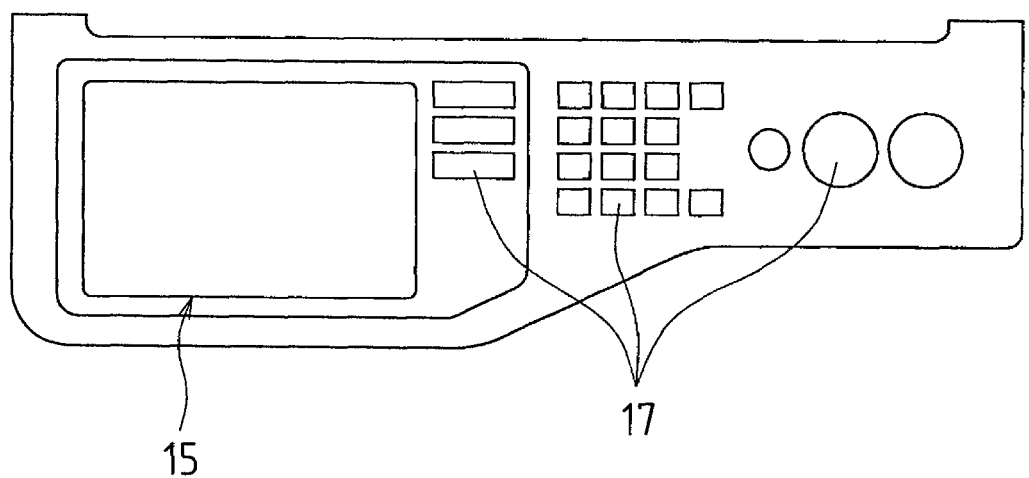
FIG. 2 shows an example configuration of an operation panel of an image forming apparatus.

The image forming apparatus 10 is provided with a CPU (Central Processing Unit) 11, a communications interface 12 (referred to below as simply the "interface 12"), a display memory 13, a display controller 14, a display 15, a program memory 16, and an operation unit 17. An operation panel shown in FIG. 2 is provided in this image forming apparatus 10, and the operation panel is provided with the display 15 as a display unit capable of input operation (see FIG. 4 below), and the operation unit 17 (operation buttons) that accepts input operations from a user (see FIG. 2).

The CPU 11 generates display data to be displayed in the display 15 according to a program held in the program memory 16, and transfers the generated display data to the display controller 14.

The display controller 14 generates a display screen based on the display data that has been transferred, stores the generated screen in the display memory 13, and displays the generated screen in the display 15.

The display 15 functions as a display unit of the image forming apparatus 10. Display data of a screen to be displayed in the display 15 is transmitted to the image monitoring apparatus 20 as image data via the interface 12, according to control by the CPU 11. The display 15 is configured to be capable of synchronization of display content with a display 28 of the image monitoring apparatus 20, described below. For example, during ordinary operation, the same content as the content being displayed in the display 15 of the image forming apparatus 10 is displayed in the display 28 of the image monitoring apparatus 20 (see FIGS. 4 and 5 below). On the other hand, when trouble has occurred, trouble messages having the same content are displayed on the display 15 of the image forming apparatus 10 and on the display 28 of the image monitoring apparatus 20 (see FIGS. 7 and 8 below), and in a state in which these trouble messages are being displayed, when the image forming apparatus 10 is remotely operated from the image monitoring apparatus 20, display of the trouble message is continued on the display 15 of the image forming apparatus 10, while simulation information (see FIG. 9 below) is displayed on the display of the image monitoring apparatus 20, so that the displayed content differs between the display 15 of the image forming apparatus 10 and the display 28 of the image monitoring apparatus 20.

The image monitoring apparatus 20 has an image monitoring apparatus main body 21 and the display 28.

The image monitoring apparatus main body 21 is provided with a CPU 22, a communications interface 23 (referred to below as simply the "interface 23"), a display memory 24, a display controller 25, and a program memory 26.

The display 28 functions as a so-called remote operation panel.

The image monitoring apparatus 20, for example, can be realized with an information processing apparatus such as a PC.

Also, the display 28 on the image monitoring apparatus 20 side may be separated from the image monitoring apparatus main body 21 and connected by a cable or the like, or may be configured as an integrated body with the image monitoring apparatus main body 21. Also, as described above, the display 28 is configured to be capable of synchronization of display content with the display 15 of the image forming apparatus 10.

The CPU 22 of the image monitoring apparatus 20 receives image data or simulation information from the image forming apparatus 10 via the interface 23, generates display data by applying the received image data or simulation information to a program held in the program memory 26, and transfers the generated display data to the display controller 25.

The display controller 25 generates a display screen based on the display data, stores the generated screen in the display memory 24, and displays the generated screen in the display 28.

Thus, in the present image processing system, by a screen displayed on the display 15 on the image forming apparatus 10 side being displayed on the display 28 on the image monitoring apparatus 20 side, it is possible to use the display 28 on the image monitoring apparatus 20 side to monitor the screen displayed on the display 15 on the image forming apparatus 10 side.

<Operation>

Following is a description of screen display operation in the above image forming system including the image forming apparatus 10 and the image monitoring apparatus 20.

(Screen Display Operation During Ordinary Processing)

Figure 3A:
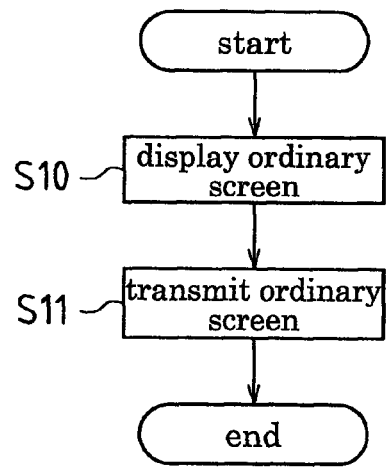
FIGS. 3A and 3B are flowcharts that show the flow of screen display operation during ordinary operation of the image processing system according to the first embodiment, where
Figure 3B:
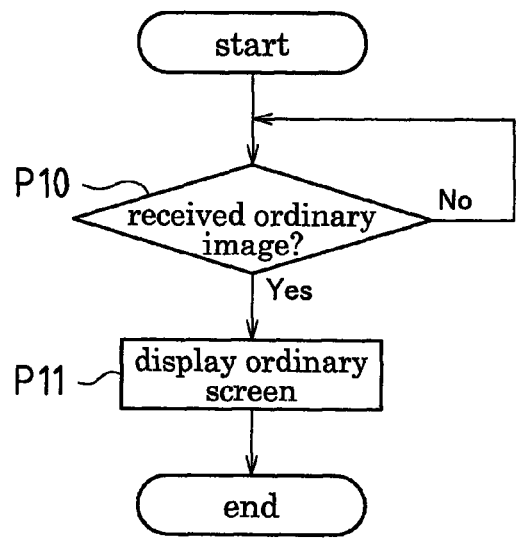

First is a description of screen display operation during ordinary processing, with reference to the flowcharts shown in FIGS. 3A and 3B. In the present description, screen display operation during ordinary processing means screen display operation when trouble is not occurring, specifically, screen display operation when implementing an image forming function such as copying, printing, faxing, scanning, or the like provided in the image forming apparatus.

Figure 4:
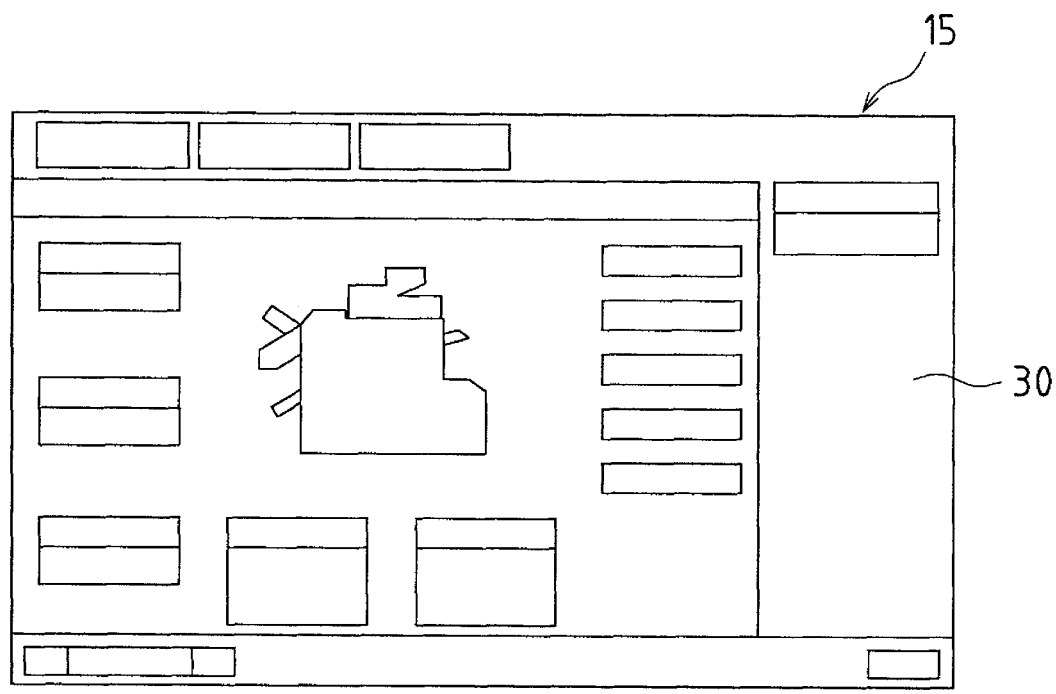
FIG. 4 shows an example of the form of display of an ordinary screen on a display of the image forming apparatus.
Figure 5:
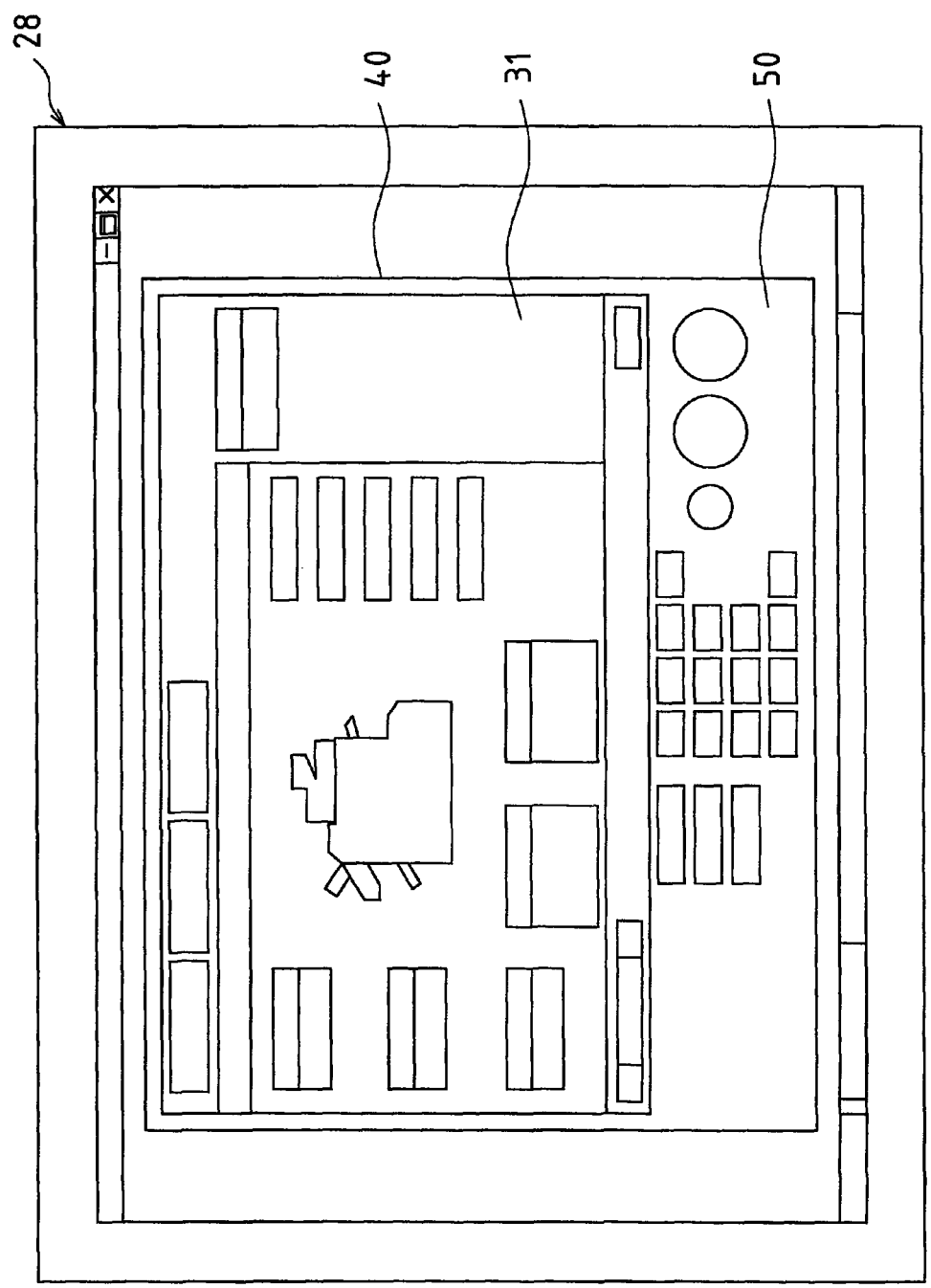
FIG. 5 shows an example of the form of display of an ordinary screen on a display of the image monitoring apparatus.

During ordinary processing, on the image forming apparatus 10 side, the display controller 14, based on an instruction of the CPU 11, displays an ordinary screen 30 as shown in FIG. 4 on the display 15 (Step S10 in FIG. 3A), and transmits image data (an ordinary image) of the displayed ordinary screen 30 to the image monitoring apparatus 20 (Step S11 in FIG. 3A). When the image data (ordinary image) of the ordinary screen 30 on the image forming apparatus 10 side is received on the image monitoring apparatus 20 side (Yes in Step P10 in FIG. 3B), the display controller 25, based on an instruction of the CPU 22, displays an ordinary screen 40 as shown in FIG. 5 on the display 28 (Step P11 in FIG. 3B). Here, in the ordinary screen 40 displayed on the display 28 on the image monitoring apparatus 20 side, in order to enable remote operation of the image forming apparatus 10 from the image monitoring apparatus 20, an image 31 as shown in FIG. 5 that is the same as the ordinary screen 30 shown in FIG. 4 that is displayed on the display 15 on the image forming apparatus 10 side, and an operation panel icon 50 that corresponds to the operation unit 17 (see FIG. 2) of the operation panel of the image forming apparatus 10, are displayed. The operation panel icon 50 is ordinarily displayed while the image monitoring apparatus 20 is monitoring the image forming apparatus 10. That is, during ordinary processing, the same display is performed on the displays 15 and 28 on the image forming apparatus 10 side and the image monitoring apparatus 20 side, other than the operation panel icon 50 being displayed on the image monitoring apparatus 20 side. That is, during ordinary processing, the screens (display content) displayed on the displays 15 and 28 are synchronized between the image forming apparatus 10 and the image monitoring apparatus 20.

Next is a description of screen display operation when trouble has occurred in the image forming apparatus 10 in the image processing system according to the first embodiment of the present invention.

(Screen Display Operation when Lift-Up Trouble Occurs)

Figure 6A:
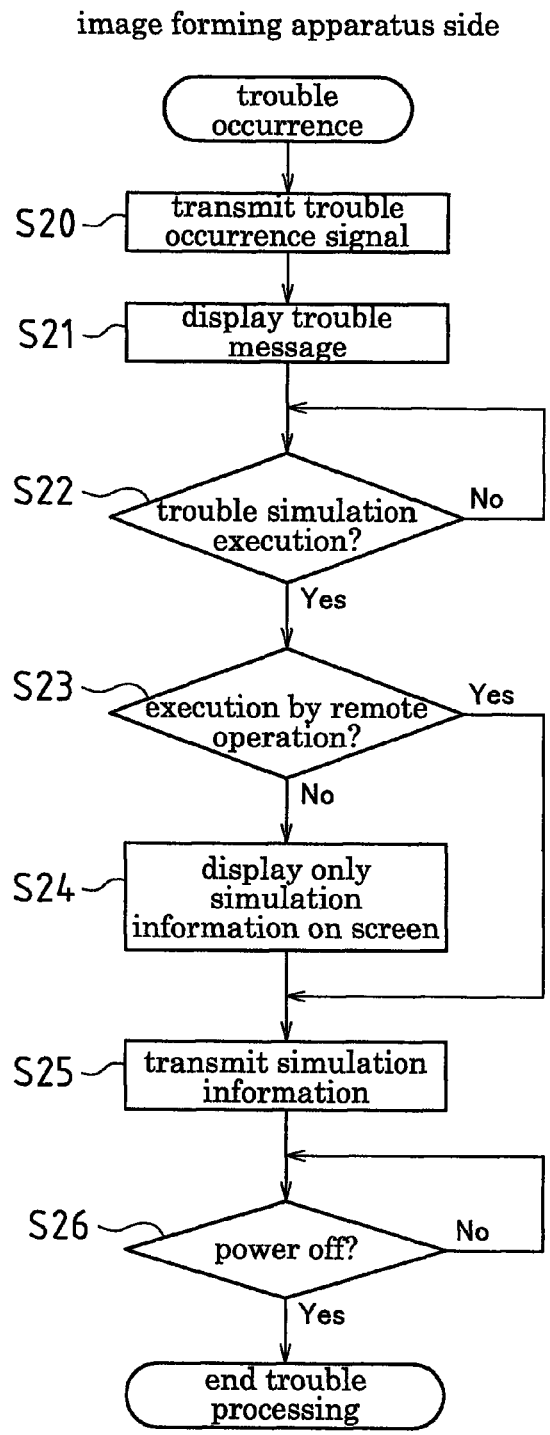
FIGS. 6A and 6B are flowcharts that show the flow of screen display operation when trouble has occurred in the image forming apparatus of the image processing system according to the first embodiment, where
Figure 6B:
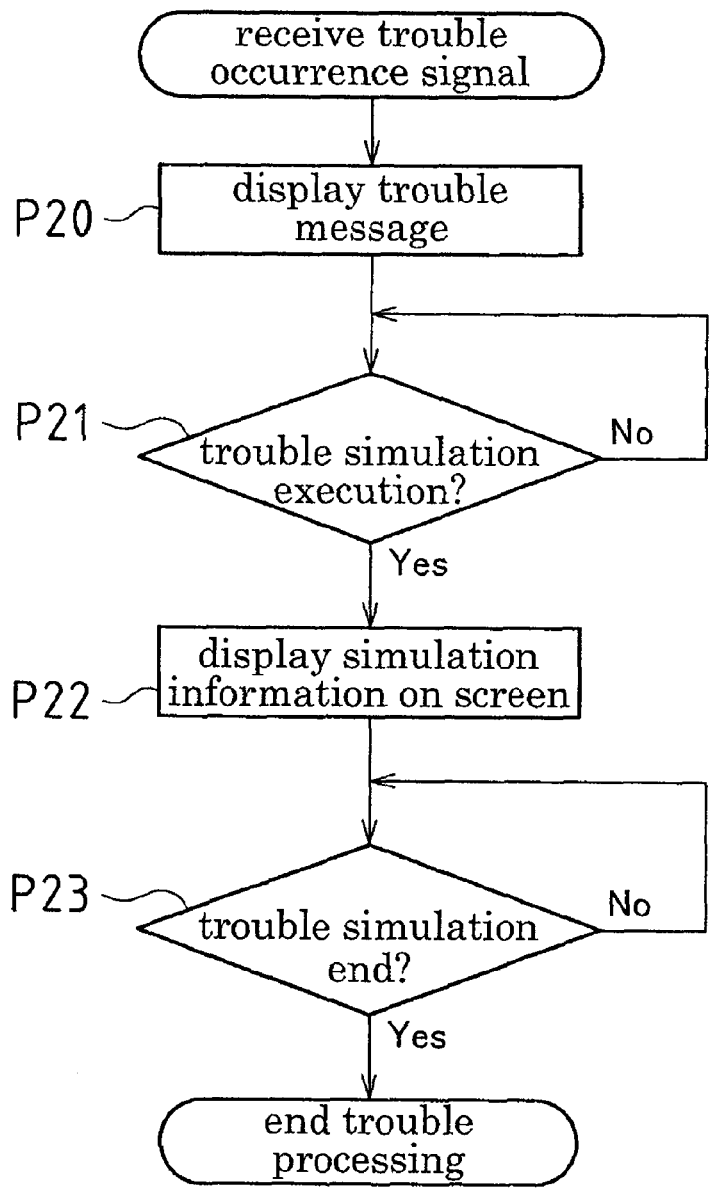

First, as a specific example, is a description of screen display operation when lift-up trouble of a paper tray has occurred in the image forming apparatus 10 in the image processing system according to the first embodiment of the present invention, with reference to the flowcharts shown in FIGS. 6A and 6B. "Lift-up trouble of a paper tray" means trouble in which even if a tray lift-up motor (a motor that lifts up paper in the tray to a paper feed position) is operated for a prescribed length of time, an upper limit detection sensor (CLUD1) disposed at the paper feed position in the tray does not turn on. Also, in the description below, execution of trouble simulation means an operation of changing the mode of the image forming apparatus 10 from an ordinary processing mode to a trouble simulation mode for resolving the trouble.

Figure 7:
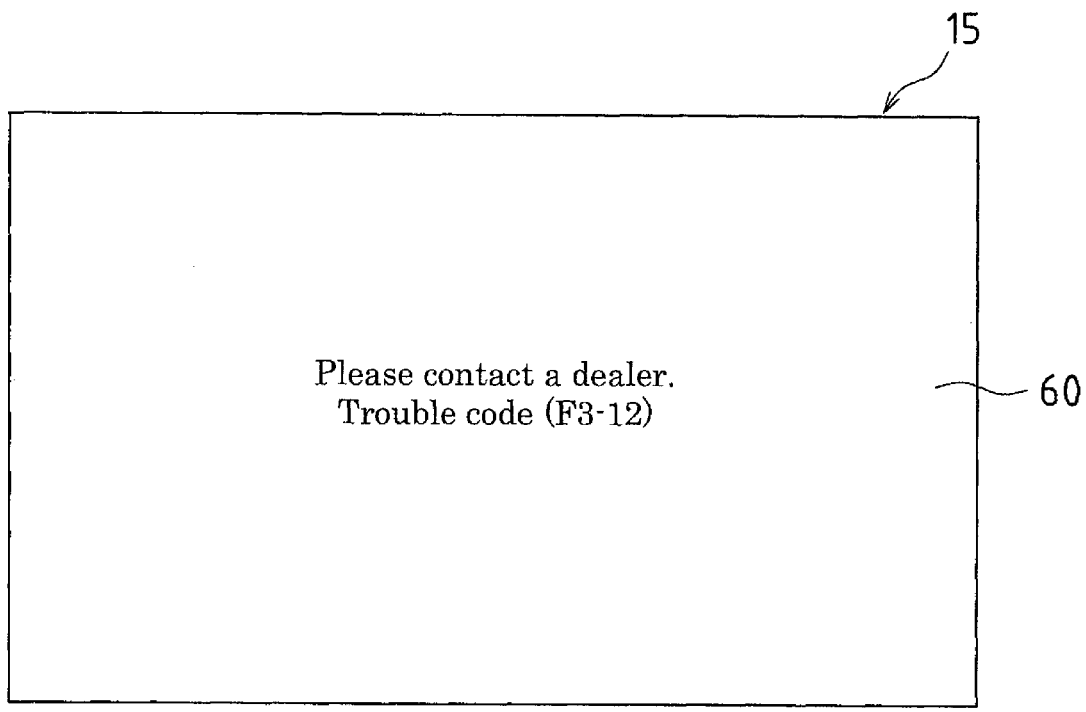
FIG. 7 shows an example of the form of display of a trouble message on the display of the image forming apparatus.

On the image forming apparatus 10 side, when tray lift-up trouble is detected, trouble processing is started, the CPU 11 transmits a trouble occurrence signal via the interface 12 to the image monitoring apparatus 20 (Step S20 in FIG. 6A), and the display controller 14, based on an instruction of the CPU 11, displays a trouble message (trouble screen 60) as shown in FIG. 7 on the display 15 (Step S21 in FIG. 6A).

Here, the trouble occurrence signal includes a trouble code "F3-12" that indicates paper tray lift-up trouble, and image data of the trouble screen 60 displayed on the display 15 on the image forming apparatus 10 side.

Also, a trouble message stating "Please contact a dealer. Trouble code (F3-12)" as shown in FIG. 7 is displayed in the trouble screen 60.

Figure 8:
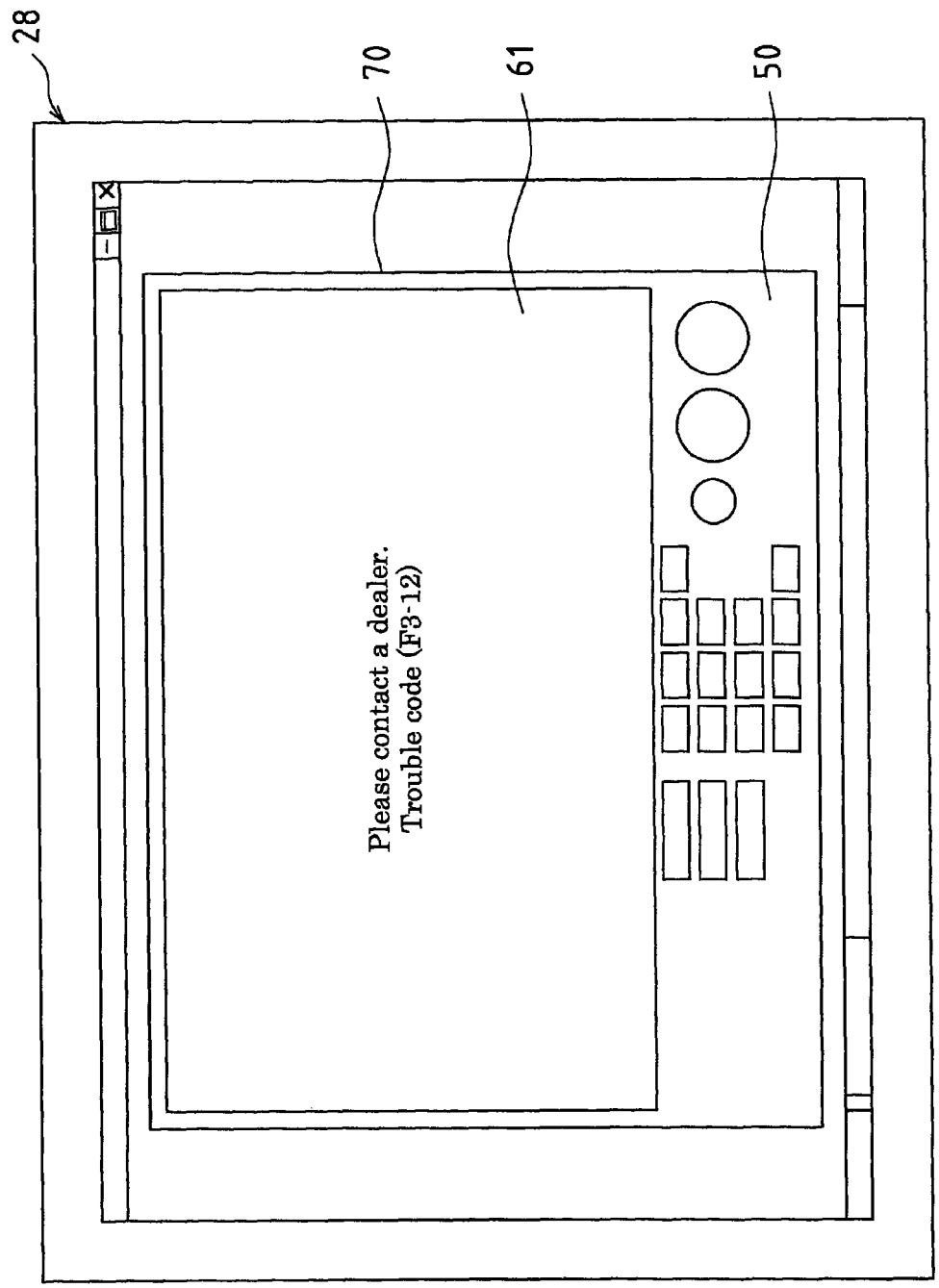
FIG. 8 shows an example of the form of display of a trouble message on the display of the image monitoring apparatus.

On the other hand, on the image monitoring apparatus 20 side, when the trouble occurrence signal is received from the image forming apparatus 10 via the interface 23, trouble processing is started, and the display controller 25, based on an instruction of the CPU 22, displays a trouble message (trouble screen 70) as shown in FIG. 8 on the display 28 (Step P20 in FIG. 6B).

In this trouble screen 70, as shown in FIG. 8, the same trouble message as the trouble screen 60 on the image forming apparatus 10 side (that is, an image 61 of the trouble screen 60), and the operation panel icon 50 that corresponds to the operation unit 17 of the image forming apparatus 10, are displayed.

The dealer (service staff) is able to confirm that the image forming apparatus 10 is in a trouble state from the trouble message display of the display 28 on the image monitoring apparatus 20 side, and can infer a conceivable cause of trouble from the trouble code included in the trouble message displayed in the display 28. In the case of the present example, there is tray lift-up trouble, so it is conceivable that there is a malfunction of the tray upper limit detection sensor.

Consequently, the service staff prompts the user to place a maximum amount of paper in the tray in order to determine whether the upper limit sensor is malfunctioning. The reason for this is that when the upper limit sensor is functioning properly, the upper limit sensor will turn on when a maximum amount of paper is placed in the tray.

In this state, the dealer (service staff) clicks on the operation panel icon 50 of the trouble screen 70 displayed on the display 28 on the image monitoring apparatus 20 side (that is, performs remote operation), or the service staff operates the operation unit 17 of the image forming apparatus 10 to set the mode of the image forming apparatus 10 to the trouble simulation mode for resolving trouble (that is, instructs execution of trouble simulation).

Also, on the image forming apparatus 10 side, when the trouble message is displayed (Step S21 in FIG. 6A), a determination is made of whether or not execution of trouble simulation has been instructed via the operation panel icon 50 of the trouble screen 70 displayed on the display 28 on the image monitoring apparatus 20 side or via the operation unit 17 of the image forming apparatus 10 (Step S22 in FIG. 6A).

When execution of trouble simulation has not been instructed (No in Step S22 in FIG. 6A), processing waits until execution of trouble simulation is instructed. When execution of trouble simulation has been instructed (Yes in Step S22 in FIG. 6A), a determination is made of whether or not that trouble simulation execution instruction was made via the operation panel icon 50 of the trouble screen 70 displayed on the display 28 on the image monitoring apparatus 20 side (that is, whether or not trouble simulation execution was instructed by remote operation)(Step S23 in FIG. 6A).

Figure 9:
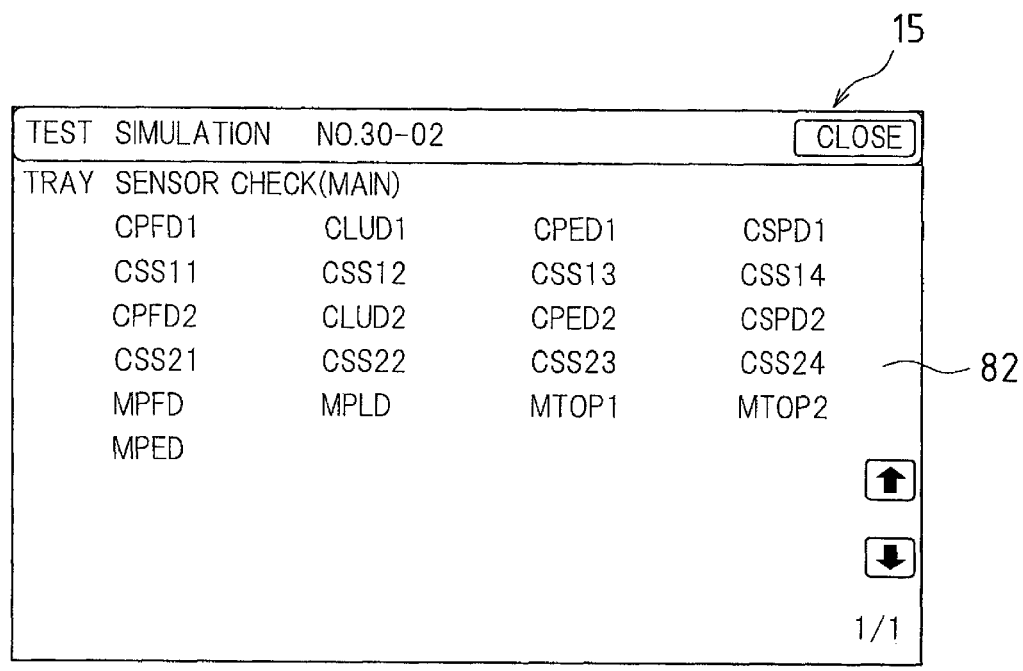
FIG. 9 shows an example of the form of display of simulation information on the display of the image forming apparatus.

When determined that trouble simulation execution was instructed by remote operation (Yes in Step S23 in FIG. 6A), the image forming apparatus 10 transmits simulation information corresponding to the remote operation content to the image monitoring apparatus 20 (Step S25 in FIG. 6A), and continues display (trouble message display) of the trouble screen 60 on the display 15 until power is turned off (Yes in Step S26). On the other hand, when determined that trouble simulation execution was not instructed by remote operation, that is, when determined that trouble simulation execution was instructed via the operation unit 17 of the image forming apparatus 10 (No in Step S23 in FIG. 6A), the display controller 14, based on an instruction of the CPU 11, displays on the display 15 simulation information (a simulation information screen 82) corresponding to the operation content for the operation unit 17 as shown in FIG. 9 (Step S24 in FIG. 6A). After displaying the simulation information (Step S24 in FIG. 6A), the image forming apparatus 10 transmits the simulation information to the image monitoring apparatus 20 (Step S25 in FIG. 6A), and continues display of the simulation screen 82 on the display 15 until power is turned off (Yes in Step S26 in FIG. 6A). The on/off states of tray sensors are shown in the simulation information screen 82 shown in FIG. 9. In the simulation information screen 82, the sensor name (sensor code) of each sensor disposed in the tray is shown such that it is possible to distinguish between an on state and an off state.

Figure 10:
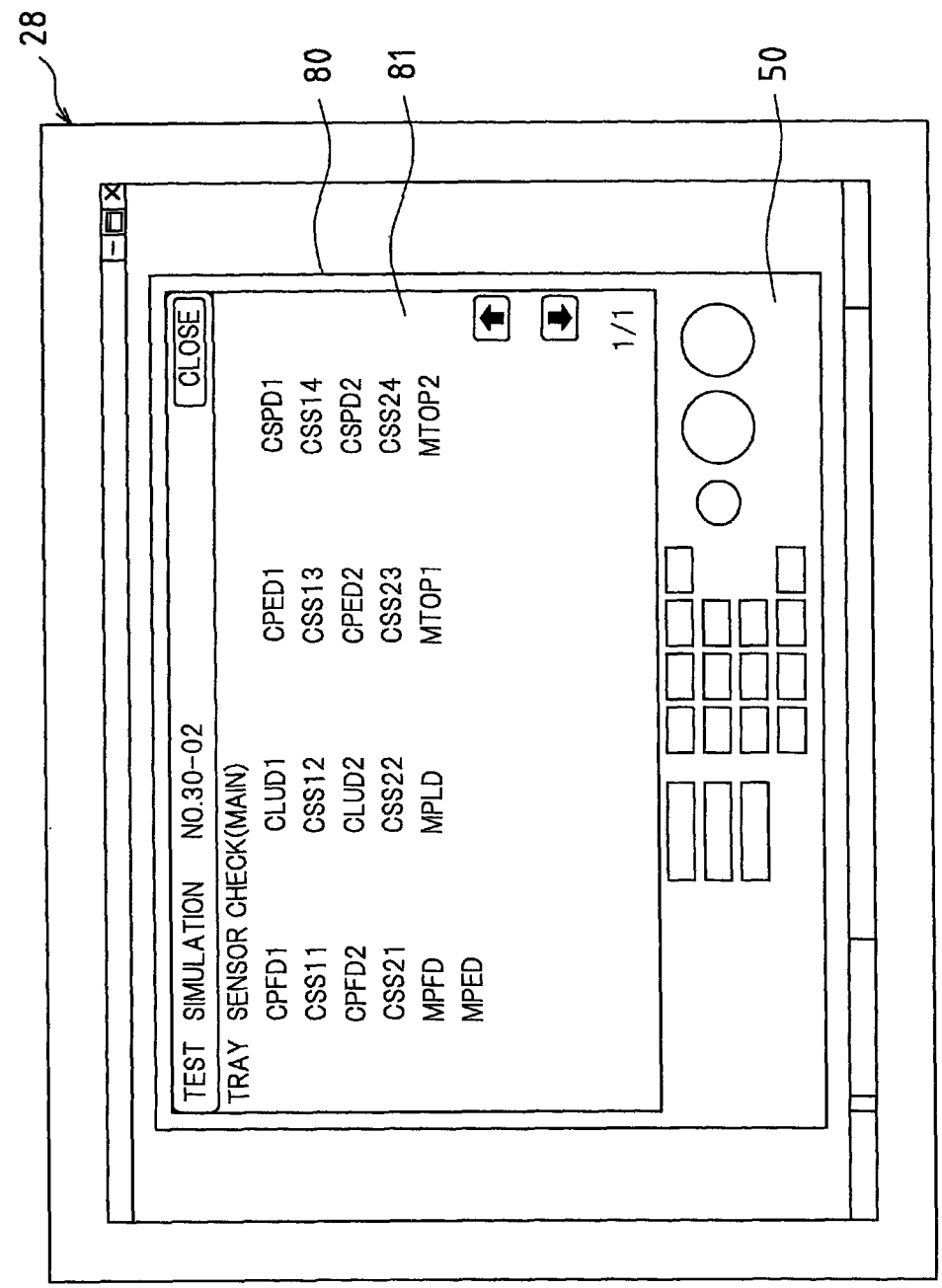
FIG. 10 shows an example of the form of display of simulation information on the display of the image monitoring apparatus.

On the other hand, on the image monitoring apparatus 20 side, when the trouble message is displayed (Step P20 in FIG. 6B), by determining whether or not the simulation information was received from the image forming apparatus 10 via the interface 23, a determination is made of whether or not there was an instruction to execute trouble simulation to the image forming apparatus 10 (Step P21 in FIG. 6B). When simulation information has not been received, a determination is made that there has not yet been a trouble simulation execution instruction to the image forming apparatus 10 (No in Step P21 in FIG. 6B), and processing waits until there is a trouble simulation execution instruction to the image forming apparatus 10 (that is, until simulation information is received). On the other hand, when simulation information has been received, a determination is made that there has been a trouble simulation execution instruction to the image forming apparatus 10 (Yes in Step P21 in FIG. 6B), and the display controller 25, based on an instruction of the CPU 22, displays on the display 28 simulation information (a simulation information screen 80) as shown in FIG. 10 (Step P22 in FIG. 6B). Display of simulation information (simulation information screen 80) on the display 28 on the image monitoring apparatus 20 side is continued until trouble simulation ends (Yes in Step P23 in FIG. 6B). Displayed in the simulation information screen 80 shown in FIG. 10 are a sensor check image 81 that indicates the on/off state of tray sensors and the operation panel icon 50 that corresponds to the operation unit 17 of the image forming apparatus 10. Here, the sensor check image 81 shows sensor names (sensor codes) such that it is possible to distinguish between an off state and an on state. Also, the trouble simulation is ended by an ending operation performed using the operation unit 17 of the image forming apparatus 10 or the operation panel icon 50 displayed on the display 28, or is ended by turning off power of the image forming apparatus 10.

From the simulation screen 80 displayed on the display 28 on the image monitoring apparatus 20 side, the dealer (service staff) is able to confirm the sensor state of the image forming apparatus 10 from a remote location. In the present example, if the tray upper limit detection sensor (CLUD1) is off even though the tray is full of paper, the upper limit detection sensor is determined to be malfunctioning.

The dealer (service staff) can inform the user of the position of the upper limit detection sensor by telephone or the like, and request that the user check whether or not the sensor is stuck in an off state due to a foreign object or the like. If the sensor is malfunctioning due to a foreign object, the trouble can be resolved by requesting that the user perform the work of removing the foreign object.

After the trouble messages (trouble screens 60 and 70) have been displayed in the display 15 of the image forming apparatus 10 and the display 28 of the image monitoring apparatus 20, when there has been a trouble simulation execution instruction to the image forming apparatus 10 from the image monitoring apparatus 20 (that is, when trouble simulation has been executed by remote operation), in order to allow the user to confirm that trouble is occurring in the image forming apparatus 10 while preventing mistaken operation by the user using the simulation information screen, the display 15 on the image forming apparatus 10 side seen by the user continues display of the trouble message (the trouble screen 60), and does not display a screen (the simulation information screen 82 as shown in FIG. 9) corresponding to the simulation screen 80 displayed in the display 28 of the image monitoring apparatus 20. Therefore, the dealer (service staff) can confirm the state of the image forming apparatus 10 by referring to the simulation information screen 80 displayed on the display 28 of the image monitoring apparatus 20, without confusing the user.

(Screen Display Operation During Jam Trouble)

Next, as a specific example of a case where jam trouble has occurred in the image forming apparatus 10 in the image processing system according to the first embodiment of the present invention, is a description of screen display operation when trouble that can be easily resolved by the user has occurred in the image forming apparatus 10, with reference to the flowcharts shown in FIGS. 6A and 6B and FIGS. 11A and 11B. When trouble that can be easily resolved by the user such as jam trouble has occurred, processing waits a fixed time period for trouble to be eliminated, and if the trouble is not eliminated after waiting the fixed time period, the image forming apparatus 10 transmits a trouble occurrence signal to the image monitoring apparatus 20 and starts the above-described trouble processing shown in the flowcharts in FIGS. 6A and 6B.

Figure 11A:
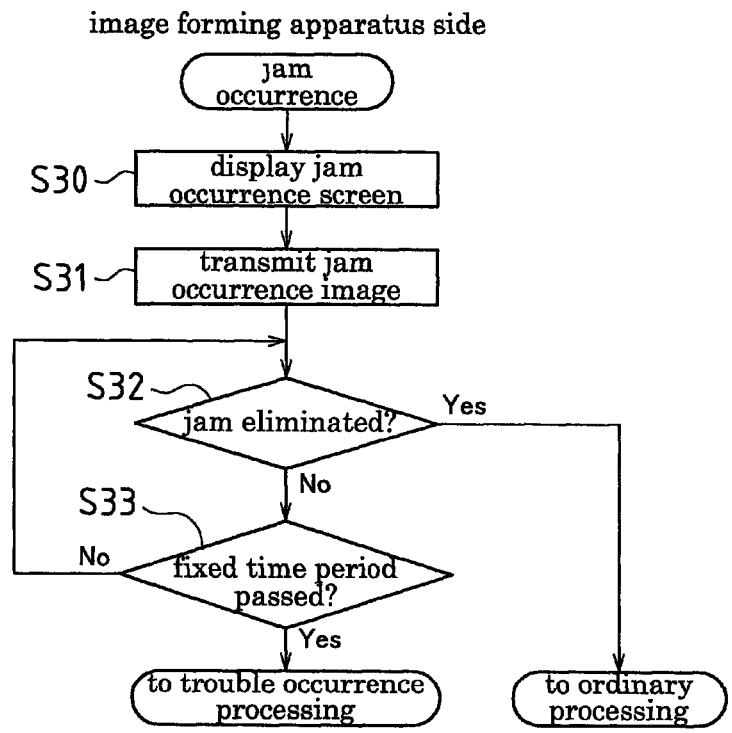
FIGS. 11A and 11B are flowcharts that show the flow of screen display operation when jam trouble has occurred in the image forming apparatus of the image processing system according to the first embodiment, where
Figure 11B:
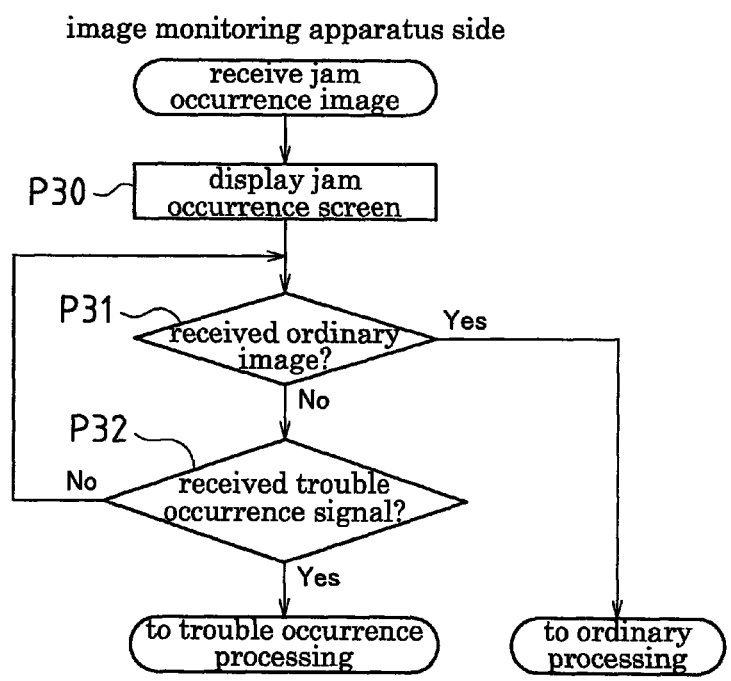
Figure 12:
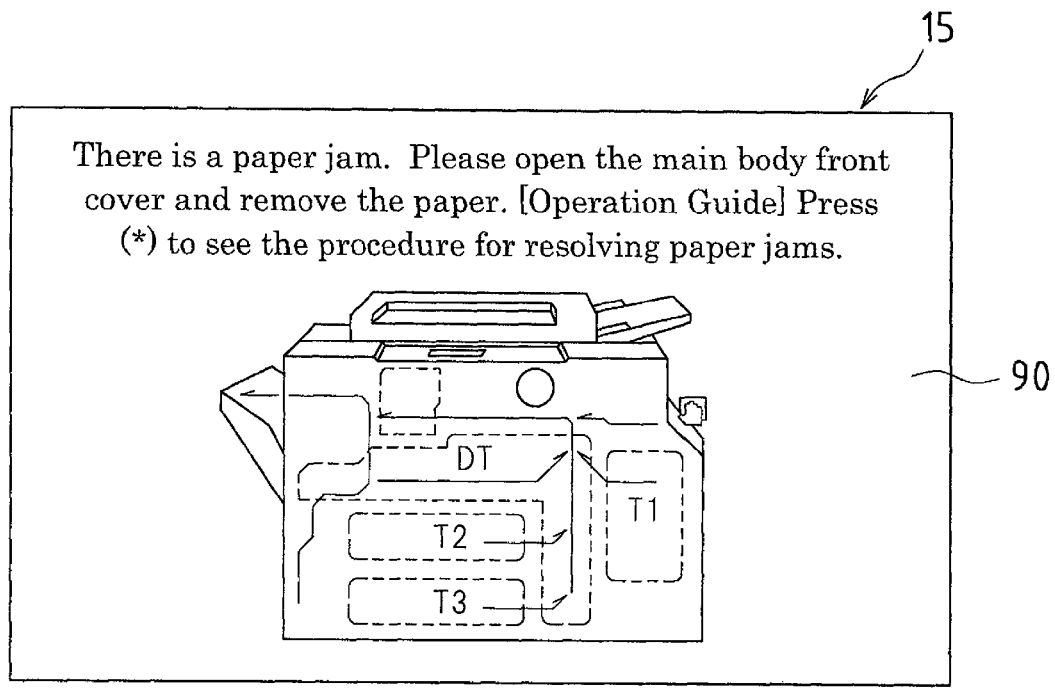
FIG. 12 shows an example of the form of display of a jam occurrence screen on the display of the image forming apparatus.
Figure 13:
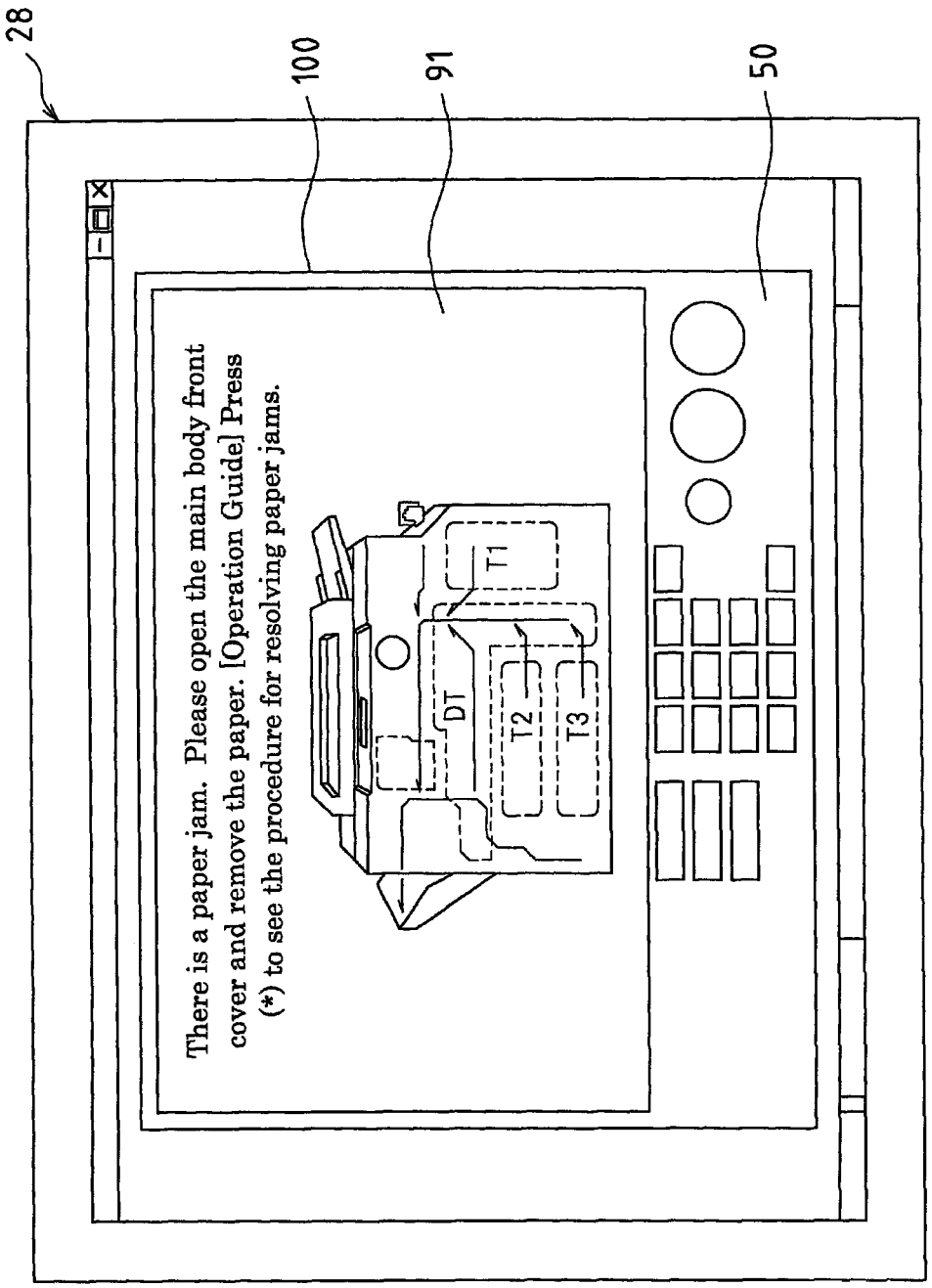
FIG. 13 shows an example of the form of display of a jam occurrence screen on the display of the image monitoring apparatus.

That is, on the image forming apparatus 10 side, when occurrence of a jam is detected, jam occurrence processing is started, and the image display controller 14, based on an instruction of the CPU 11, displays on the display 15 a jam occurrence screen 90 as shown in FIG. 12 (Step S30 in FIG. 11A). In this jam occurrence screen 90, for example, together with an illustration image of the image forming apparatus 10 as shown in FIG. 12, jam elimination guidance stating, for example, "There is a paper jam. Please open the main body front cover and remove the paper. [Operation Guide] Press (*) to see the procedure for resolving paper jams." is displayed. Next, the image forming apparatus 10 transmits the image data (jam occurrence image) of the jam occurrence screen 90 displayed on the display 15 to the image monitoring apparatus 20 (Step S31 in FIG. 11A). At this time, on the image monitoring apparatus 20 side, when the image data (jam occurrence image) of the jam occurrence screen 90 is received from the image forming apparatus 10, jam occurrence processing is started, and the display controller 25, based on an instruction of the CPU 22, displays on the display 28 a jam occurrence screen 100 as shown in FIG. 13 (Step P30 in FIG. 11B). Displayed in the jam occurrence screen 100 are an image 91 of the jam occurrence screen 90 displayed on the display 15 on the image forming apparatus 10 side, and the operation panel icon 50 that corresponds to the operation unit 17 of the image forming apparatus 10, as shown in FIG. 13.

On the image forming apparatus 10 side, the jam occurrence screen 90 is displayed (Step S30 in FIG. 11A), and when the image data of the displayed jam occurrence screen 90 is transmitted to the image monitoring apparatus 20 (Step S31 in FIG. 11A), the CPU 11 determines whether or not the jam has been eliminated (Step S32 in FIG. 11A), and if the jam has been eliminated (Yes in Step S32 in FIG. 11A), processing returns to the above-described ordinary processing, the display controller 14 displays an ordinary screen on the display 15 (Step S10 in FIG. 3A), and furthermore the image data of the ordinary screen is transmitted via the interface 12 to the image monitoring apparatus 20 (Step S11 in FIG. 3A). Accordingly, on the image monitoring apparatus 20 side, when the image data of the ordinary screen transmitted by the image forming apparatus 10 is received (Yes in Step P31 of FIG. 11B), processing returns to the above-described ordinary processing, a determination is made that the ordinary screen was received (Yes in Step P10 in FIG. 3B), and the display controller 25 displays the ordinary screen on the display 28 (Step P11 in FIG. 3B).

On the other hand, when the jam has not been eliminated (No in Step S32 in FIG. 11A), the CPU 11 on the image forming apparatus 10 side determines whether or not a fixed time period has passed (Step S33 shown in FIG. 11A). When determined that the fixed time period has not passed (No in Step S33 in FIG. 11A), a determination of whether or not the jam has been eliminated is again made (Step S32 in FIG. 11A). That is, the determination of whether or not the jam has been eliminated (Step S32 in FIG. 11A) is repeated until the jam is eliminated (Yes in Step S32 in FIG. 11A) or until the fixed time period has passed (Yes in Step S33 in FIG. 11A). When the fixed time period has passed but the jam has not been eliminated (Yes in Step S33 in FIG. 11A), the CPU 11 on the image forming apparatus 10 side judges that trouble has occurred, starts the above-described trouble processing shown in the flowchart in FIG. 6A, and transmits a trouble occurrence signal via the interface 12 to the image monitoring apparatus 20 (Step S20 in FIG. 6A). Next, the display controller 14 on the image forming apparatus 10 side, based on an instruction of the CPU 11 on the image forming apparatus 10 side, displays a trouble message (trouble screen) on the display 15 on the image forming apparatus 10 side (Step S21 in FIG. 6A).

Here, the trouble occurrence signal includes a trouble code that indicates jam trouble, and image data of the trouble screen 60 displayed on the display 15 on the image forming apparatus 10 side.

On the other hand, on the image monitoring apparatus 20 side, when the trouble occurrence signal (including a jam trouble code, and image data of the trouble screen 60 displayed on the display 15 on the image forming apparatus 10 side) is received from the image forming apparatus 10 via the interface 23, a determination is made not that image data of an ordinary screen was received (No in Step P31 in FIG. 11B), but rather that the trouble occurrence signal was received (Yes in Step P32 in FIG. 11B), the above-described trouble processing shown in the flowchart in FIG. 6B is started, and the display controller 25, based on an instruction of the CPU 22, displays a trouble message (the trouble screen 70 with the operation panel icon 50) on the display 28 (Step P20 in FIG. 6B).

In this state, the dealer (service staff) clicks on the operation panel icon 50 of the trouble screen 70 displayed on the display 28 on the image monitoring apparatus 20 side (that is, performs remote operation), or the service staff operates the operation unit 17 of the image forming apparatus 10 to set the mode of the image forming apparatus 10 to the trouble simulation mode for resolving trouble (that is, instructs execution of trouble simulation).

Also, on the image forming apparatus 10 side, when the trouble message is displayed (Step S21 in FIG. 6A), a determination is made of whether or not execution of trouble simulation has been instructed via the operation panel icon 50 of the trouble screen 70 displayed on the display 28 on the image monitoring apparatus 20 side or via the operation unit 17 of the image forming apparatus 10 (Step S22 in FIG. 6A). When execution of trouble simulation has not been instructed (No in Step S22 in FIG. 6A), processing waits until execution of trouble simulation is instructed. When execution of trouble simulation has been instructed (Yes in Step S22 in FIG. 6A), a determination is made of whether or not that trouble simulation execution instruction was made via the operation panel icon 50 of the trouble screen 70 displayed on the display 28 on the image monitoring apparatus 20 side (that is, whether or not trouble simulation execution was instructed by remote operation)(Step S23 in FIG. 6A).

When determined that trouble simulation execution was instructed by remote operation (Yes in Step S23 in FIG. 6A), the image forming apparatus 10 transmits simulation information corresponding to the remote operation content to the image monitoring apparatus 20 (Step S25 in FIG. 6A), and continues display (trouble message display) of the trouble screen 60 on the display 15 until power is turned off (Yes in Step S26 in FIG. 6A). On the other hand, when determined that trouble simulation execution was not instructed by remote operation, that is, when determined that trouble simulation execution was instructed via the operation unit 17 of the image forming apparatus 10 (No in Step S23 in FIG. 6A), the display controller 14, based on an instruction of the CPU 11, displays on the display 15 simulation information (the simulation information screen 82) corresponding to the operation content for the operation unit 17 as shown in FIG. 9 (Step S24 in FIG. 6A). After displaying the simulation information (Step S24 in FIG. 6A), the image forming apparatus 10 transmits the simulation information to the image monitoring apparatus 20 (Step S25 in FIG. 6A), and continues display of the simulation screen 82 on the display 15 until power is turned off (Yes in Step S26 in FIG. 6A).

On the other hand, on the image monitoring apparatus 20 side, when the trouble message is displayed (Step P20 in FIG. 6B), by determining whether or not the simulation information was received from the image forming apparatus 10 via the interface 23, a determination is made of whether or not there was an instruction to execute trouble simulation to the image forming apparatus 10 (Step P21 in FIG. 6B). When simulation information has not been received, a determination is made that there has not yet been a trouble simulation execution instruction to the image forming apparatus 10 (No in Step P21 in FIG. 6B), and processing waits until there is a trouble simulation execution instruction to the image forming apparatus 10 (that is, until simulation information is received). On the other hand, when simulation information has been received, a determination is made that there has been a trouble simulation execution instruction to the image forming apparatus 10 (Yes in Step P21 in FIG. 6B), and the display controller 25, based on an instruction of the CPU 22, displays on the display 28 simulation information (the simulation information screen 80) as shown in FIG. 10 (Step P22 in FIG. 6B). Display of simulation information (simulation information screen 80) on the display 28 on the image monitoring apparatus 20 side is continued until trouble simulation ends (Yes in Step P23 in FIG. 6B).

Same as when lift-up trouble was detected, after the trouble messages (trouble screens 60 and 70) have been displayed in the display 15 of the image forming apparatus 10 and the display 28 of the image monitoring apparatus 20, when there has been a trouble simulation execution instruction to the image forming apparatus 10 from the image monitoring apparatus 20 (that is, when trouble simulation has been executed by remote operation), in order to allow the user to confirm that trouble is occurring in the image forming apparatus 10 while preventing mistaken operation by the user using the simulation information screen, the display 15 on the image forming apparatus 10 side seen by the user continues display of the trouble message (the trouble screen 60), and does not display a screen (the simulation information screen 82 as shown in FIG. 9) corresponding to the simulation screen 80 displayed in the display 28 of the image monitoring apparatus 20. Therefore, the dealer (service staff) can confirm the state of the image forming apparatus 10 by referring to the simulation information screen 80 displayed on the display 28 of the image monitoring apparatus 20, without confusing the user.

As described above, when a jam has occurred in the image forming apparatus 10, processing waits for passage of a fixed time period after the jam occurrence, and if the jam is not eliminated after passage of the fixed time period, trouble processing is started. The trouble processing when a jam has occurred is the same as the trouble processing when lift-up trouble has occurred. That is, in the image forming system according to the present embodiment, regardless of the type of trouble, the above-described trouble processing shown in the flowchart in FIG. 6 is executed. However, the trouble messages (trouble screens 60 and 70) and simulation information (simulation information screens 80 and 82) displayed on the display 15 of the image forming apparatus 10 and the display 28 of the image monitoring apparatus 20 differ depending on the type of trouble. Specifically, various trouble messages and simulation information (simulation information screens) are displayed on the display 15 of the image forming apparatus 10 and the display 28 of the image monitoring apparatus 20 in coordination with a trouble code, or the content of operation via the operation unit 17 or the operation panel icon 50. For example, the simulation information displayed when jam trouble has occurred may indicate the on/off state of sensors disposed in a paper transport path.

<Operation/Effects>

As is clear from the above description, the below operation and effects are obtained according to the present embodiment.

When trouble occurs in the image forming apparatus 10, the image forming apparatus 10 displays a trouble message (the trouble screen 60) on the display 15, and transmits a trouble occurrence signal to the image monitoring apparatus 20. Upon receiving this trouble occurrence signal, the image monitoring apparatus 20 displays on the display 28 the same trouble message (the trouble screen 70 with the operation panel icon 50) as the trouble message displayed in the image forming apparatus 10. In a state in which the trouble message (the trouble screen 70 with the operation panel icon 50) has been displayed on the display 28 of the image monitoring apparatus 20, when trouble simulation is executed by a remote operation using the operation panel icon 50 displayed on the trouble screen 70, while display of the trouble message is continued in the display 15 of the image forming apparatus 10, simulation information (the simulation information screen 80 with the operation panel icon 50) related to the trouble of the image forming apparatus 10 is displayed on the display 28 of the image monitoring apparatus 20. That is, even if the form of display on the display 28 on the image monitoring apparatus 20 side changes from trouble message display (trouble screen 70 display) to simulation information display (simulation information screen 80 display), trouble message display (trouble screen 60 display) on the display 15 on the image forming apparatus 10 side is continued. Therefore, when there is trouble in the image forming apparatus 10, it is possible to prevent mistaken identification/mistaken operation by the user.

In addition, in a state in which the trouble message has been displayed on the display 15 of the image forming apparatus 10, it is possible to remotely operate the image forming apparatus 10 from the image monitoring apparatus 20, so the dealer (service staff), while having the user identify that trouble is occurring in the image forming apparatus 10, can confirm the operational state of the image forming apparatus 10 by referring to the simulation information displayed on the display 28 of the image monitoring apparatus 20, so it is possible to prompt the user to perform a trouble resolving operation or to cause the user to perform such an operation, depending on the state of the image forming apparatus 10.

Also, the dealer (service staff) can travel to the user site after becoming aware of the operational state of the image forming apparatus 10, so the time until trouble is resolved can be shortened.

Second Embodiment

The configuration of the present embodiment is the same as the configuration of the first embodiment, except that (1) when the image forming apparatus 10 has been remotely operated during the occurrence of trouble, the display 15 on the image forming apparatus 10 side displays a trouble message together with a remote operation message on the same screen, and (2) when remote operation of the image forming apparatus 10 has been performed during the occurrence of trouble, the display 28 on the image monitoring apparatus 20 side displays simulation information related to the trouble of the image forming apparatus 10, and a trouble message having the same content as the trouble message displayed in the image forming apparatus 10, on the same screen.

<Configuration>

The configuration of the image processing system according to the second embodiment of the present invention is the same as the configuration of the image processing system according to the above first embodiment shown in FIG. 1. Therefore, a description of that configuration is omitted here.

<Operation>

Following is a description of screen display operation in the image processing system according to the present embodiment, with reference to the flowcharts in FIGS. 11A and 11B and FIGS. 14A and 14B. Note that the screen display operation during ordinary operation is the same as in the image processing system according to the above first embodiment shown in the flowcharts in FIGS. 3A and 3B, so a description thereof is omitted here. Below is a description of the screen display operation when trouble has occurred in the image forming apparatus 10 in the image processing system according to the second embodiment of the present invention.

(Screen Display Operation when Lift-Up Trouble Occurs)

Figure 14A:
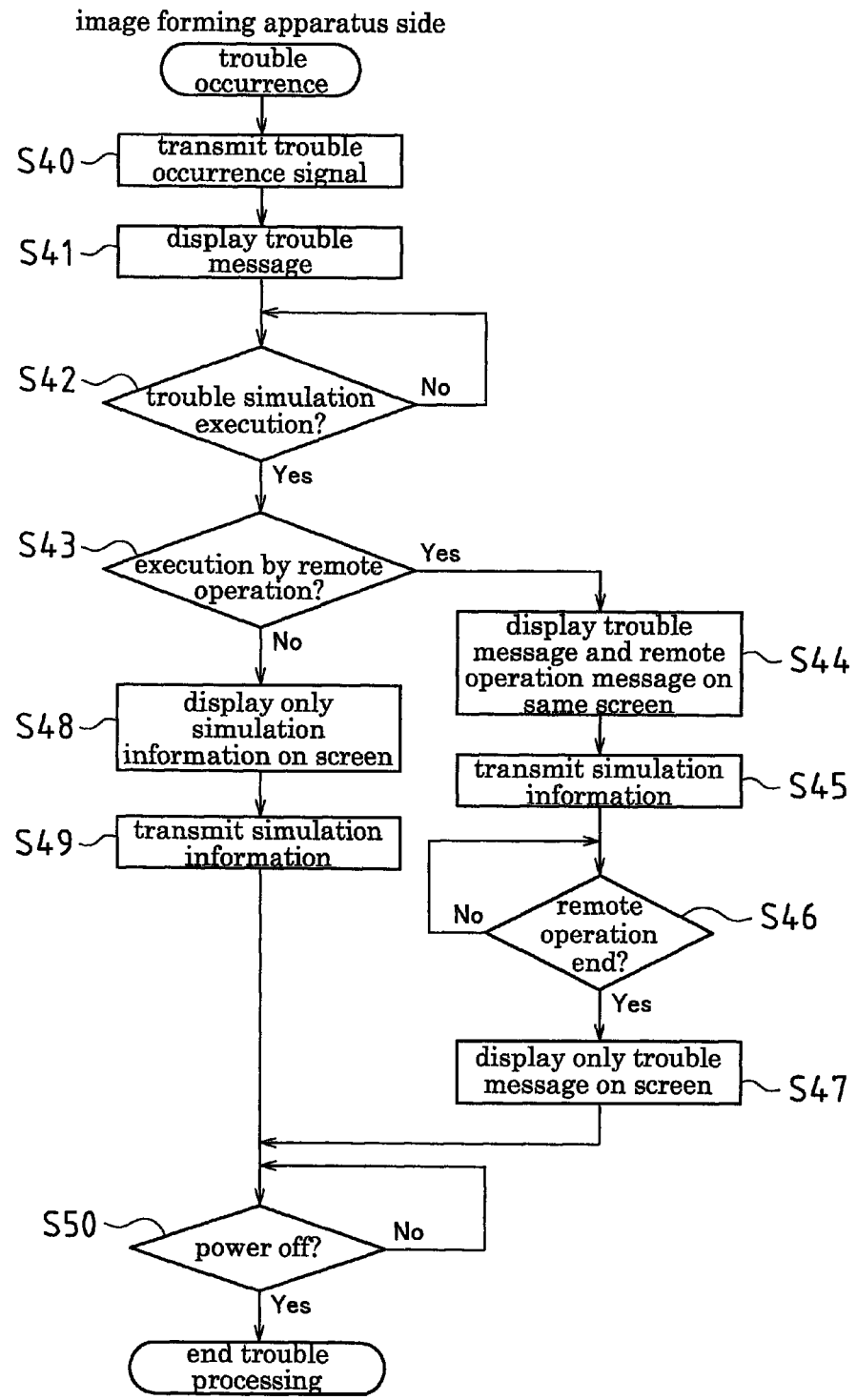
FIGS. 14A and 14B are flowcharts that show the flow of screen display operation when trouble has occurred in an image forming apparatus of an image processing system according to a second embodiment, where
Figure 14B:
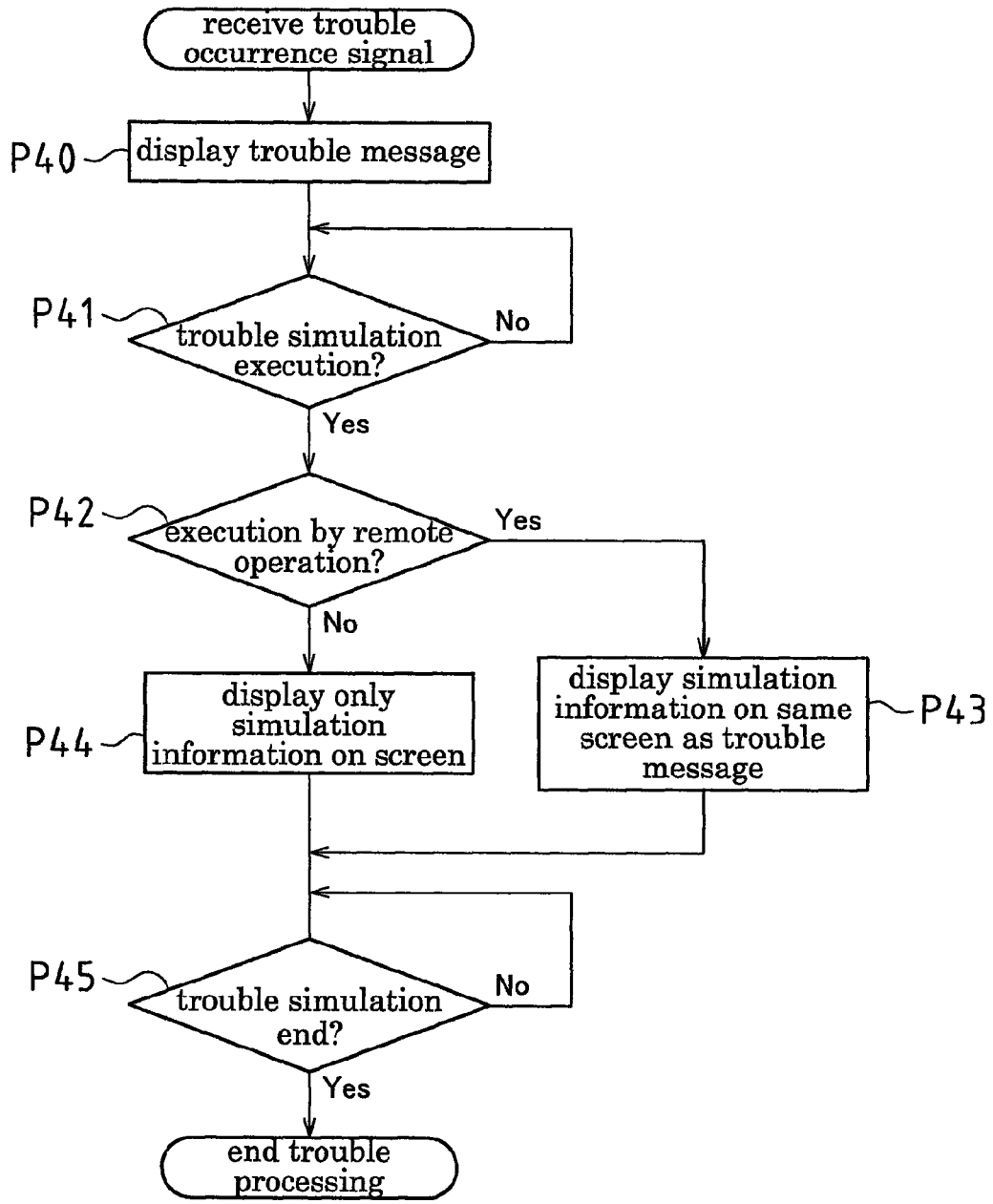

First, as a specific example, is a description of screen display operation when lift-up trouble of a paper tray has occurred in the image forming apparatus 10 in the image processing system according to the second embodiment of the present invention, with reference to the flowcharts shown in FIGS. 14A and 14B.

On the image forming apparatus 10 side, when paper tray lift-up trouble is detected, trouble processing is started, the CPU 11 transmits a trouble occurrence signal including a paper tray lift-up trouble code "F3-12" and trouble message image data to the image monitoring apparatus 20 (Step S40 in FIG. 14A), and the display controller 25, based on an instruction of the CPU 11, displays the trouble message (trouble screen 60) as shown in FIG. 7 on the display 15. Here, a message stating "Please contact a dealer. Trouble code (F3-12)" as shown in FIG. 7 is displayed in the trouble screen 60.

On the other hand, on the image monitoring apparatus 20 side, when the trouble occurrence signal (including the tray lift-up trouble code "F3-12", and image data of the trouble message displayed on the display 15 on the image forming apparatus 10 side) is received from the image forming apparatus 10 via the interface 23, trouble processing is started, and the display controller 25, based on an instruction of the CPU 22, displays the trouble message (trouble screen 70) as shown in FIG. 8 on the display 28 on the image monitoring apparatus 20 side (Step P40 in FIG. 14B). In this trouble screen 70, the same trouble message (that is, the image 61 of the trouble screen 60) as in the trouble screen 60 on the image forming apparatus 10 side as shown in FIG. 8, and the operation panel icon 50 that corresponds to the operation unit 17 of the image forming apparatus 10, are displayed.

The dealer (service staff) is able to confirm that the image forming apparatus 10 is in a trouble state from the trouble message display of the display 28 on the image monitoring apparatus 20 side, and can infer a conceivable cause of trouble from the trouble code included in the trouble message displayed in the display 28. In the case of the present example, the trouble that has occurred is tray lift-up trouble, so it is conceivable that there is a malfunction of the tray upper limit detection sensor.

Consequently, the service staff prompts the user to place a maximum amount of paper in the tray in order to judge whether or not the upper limit sensor is malfunctioning. The reason for this is as stated in the first embodiment.

In this state, the dealer (service staff) clicks on the operation panel icon 50 of the trouble screen 70 displayed on the display 28 on the image monitoring apparatus 20 side (that is, performs remote operation), or the service staff operates the operation unit 17 of the image forming apparatus 10 to set the mode of the image forming apparatus 10 to the trouble simulation mode for resolving trouble (that is, instructs execution of trouble simulation).

Also, on the image forming apparatus 10 side, when the trouble message is displayed (Step S41 in FIG. 14A), a determination is made of whether or not execution of trouble simulation has been instructed via the operation panel icon 50 of the trouble screen 70 displayed on the display 28 on the image monitoring apparatus 20 side or via the operation unit 17 of the image forming apparatus 10 (Step S42 in FIG. 14A). When execution of trouble simulation has not been instructed (No in Step S42 in FIG. 14A), processing waits until execution of trouble simulation is instructed. When execution of trouble simulation has been instructed (Yes in Step S42 in FIG. 14A), a determination is made of whether or not that trouble simulation execution instruction was made via the operation panel icon 50 of the trouble screen 70 displayed on the display 28 on the image monitoring apparatus 20 side (that is, whether or not trouble simulation execution was instructed by remote operation)(Step S43 in FIG. 14A).

Figure 15:
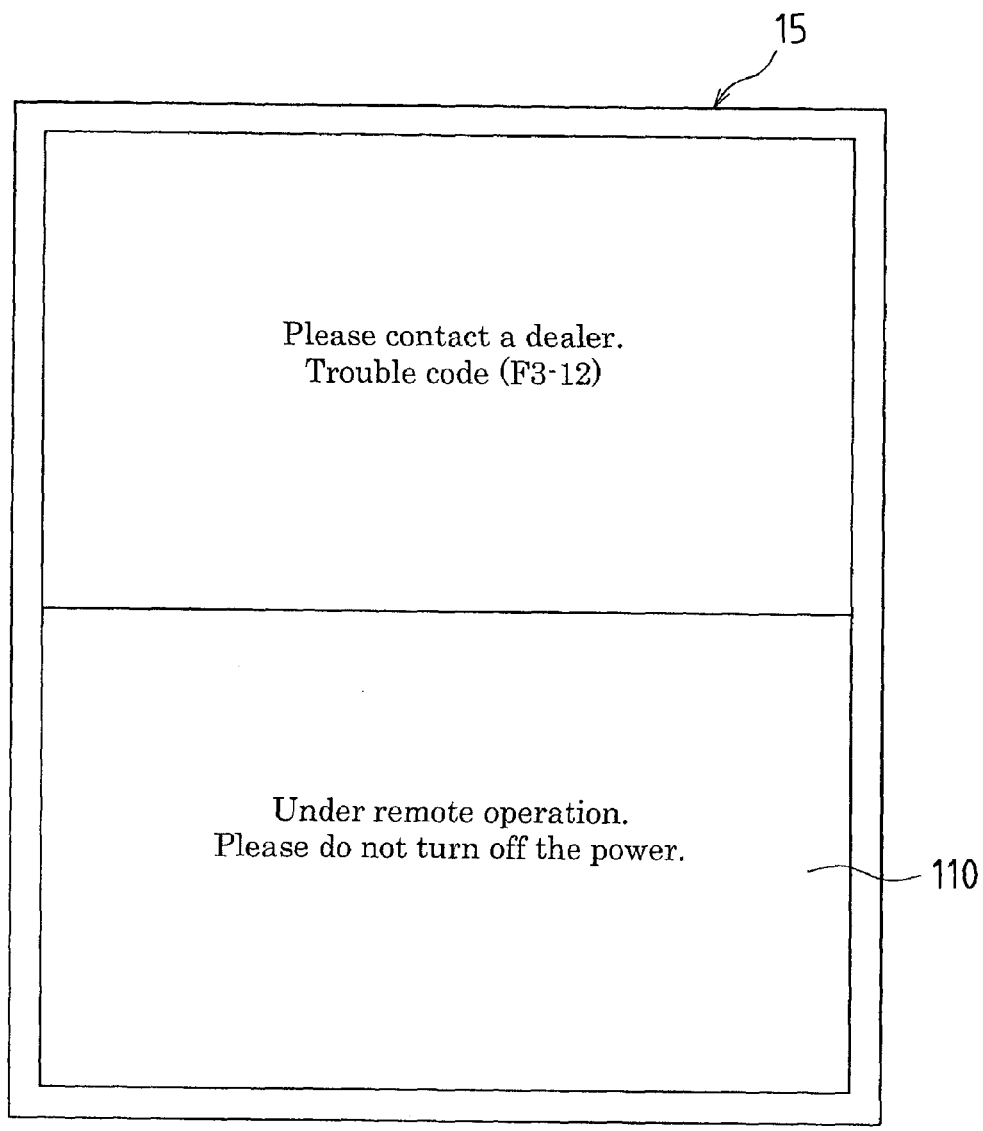
FIG. 15 shows an example of the form of same screen display of a trouble message and a remote operation message on the display of the image forming apparatus.

On the image forming apparatus 10 side, when determined that trouble simulation execution was instructed by remote operation (Yes in Step S43 in FIG. 14A), the display controller 14, based on an instruction of the CPU 11, displays on the display 15 a trouble message and a remote operation message (trouble screen 110 with a remote operation message) as shown in FIG. 15 (Step S44 in FIG. 14A). This trouble screen 110 with a remote operation message, for example, as shown in FIG. 15, is divided in upper/lower halves. Specifically, a trouble message stating "Please contact a dealer. Trouble code (F3-12)" is displayed in the upper portion of the screen, and a remote operation message stating "Under remote operation. Please do not turn off the power." is displayed in the lower portion of the screen. After the trouble message and the remote operation message are displayed (Step S44 in FIG. 14A), simulation information corresponding to the remote operation content is transmitted to the image monitoring apparatus 20 (Step S45 in FIG. 14A). Then, processing waits until remote operation from the image monitoring apparatus 20 ends, specifically, until there is an instruction to end trouble simulation from the image monitoring apparatus 20, and when determined that remote operation has ended (Yes in Step S46 in FIG. 14A), display of the remote operation message is ended, so that only the trouble message (the trouble screen 60 as shown in FIG. 8) is displayed on the display 15 (Step S47 shown in FIG. 14A), and display of this trouble message (the trouble screen 60) is continued until power is turned off (Yes in Step S50 shown in FIG. 14A).

On the image forming apparatus 10 side, when determined that trouble simulation execution has not been instructed by remote operation, that is, when determined that trouble simulation execution was instructed via the operation unit 17 of the image forming apparatus 10 (No in Step S43 in FIG. 14A), the display controller 14, based on an instruction of the CPU 11, displays on the display 15 of the image forming apparatus 10 the simulation information (the simulation information screen 82 as shown in FIG. 9) corresponding to the operation content for the operation unit 17 (Step S48 in FIG. 14A). Then, the simulation information displayed on the display 15 is transmitted to the image monitoring apparatus 20 (Step S49 in FIG. 14A), and display of the simulation information is continued until power is turned off (Yes in Step S50 shown in FIG. 14A).

On the other hand, on the image monitoring apparatus 20 side, when the trouble message is displayed (Step P40 in FIG. 14B), by determining whether or not the simulation information was received from the image forming apparatus 10 via the interface 23, a determination is made of whether or not there was an instruction to execute trouble simulation to the image forming apparatus 10 (Step P41 in FIG. 14B). When simulation information has not been received, a determination is made that there has not yet been a trouble simulation execution instruction to the image forming apparatus 10 (No in Step P41 in FIG. 14B), and processing waits until there is a trouble simulation execution instruction to the image forming apparatus 10 (that is, until simulation information is received). On the other hand, when simulation information has been received, a determination is made that there has been a trouble simulation execution instruction to the image forming apparatus 10 (Yes in Step P41 in FIG. 14B), and a determination is made of whether or not this trouble simulation execution instruction was made by an instruction from the image monitoring apparatus 20 (that is, whether or not the trouble simulation execution instruction was made by a remote operation)(Step P42 in FIG. 14B).

Figure 16:
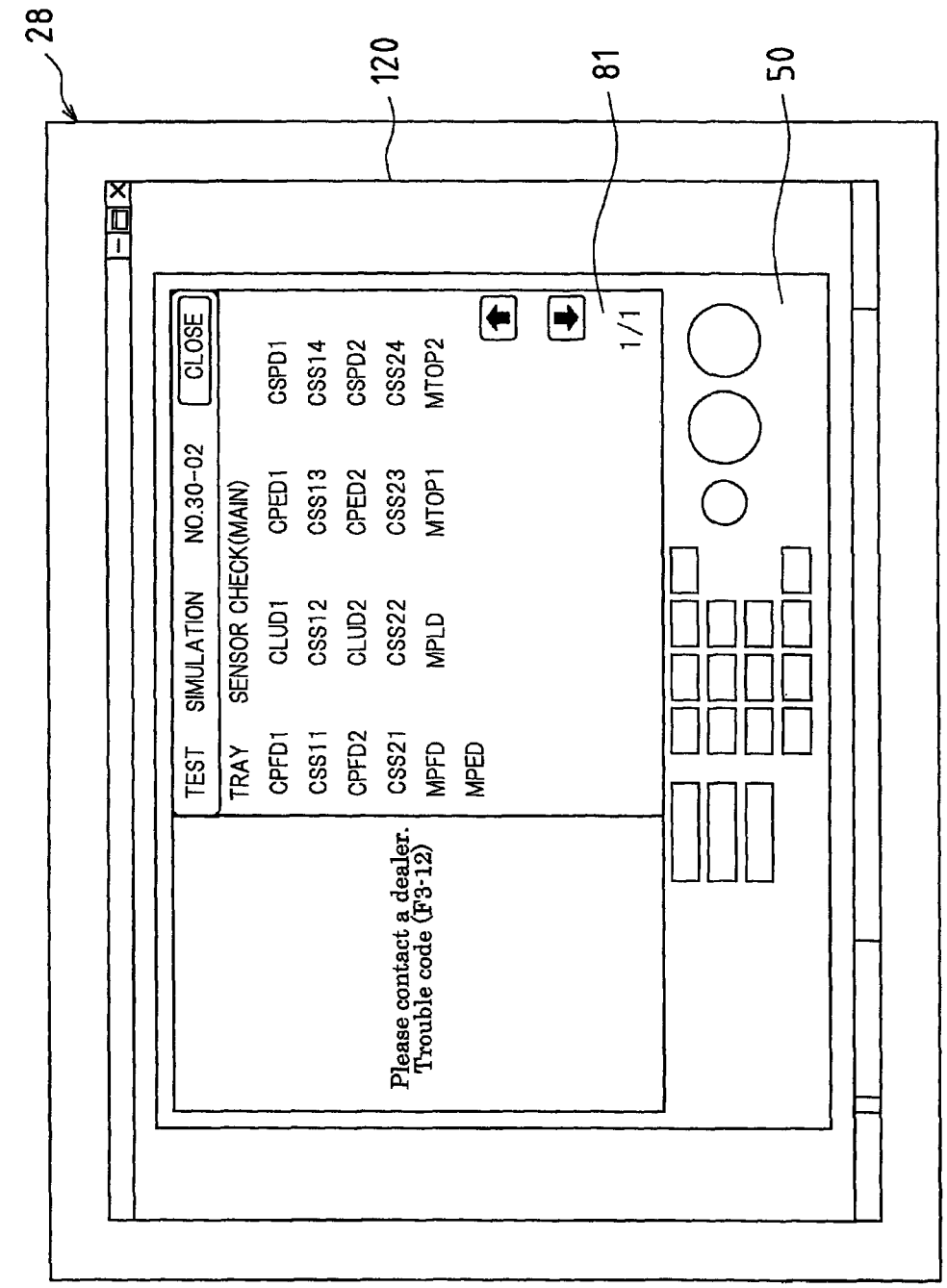
FIG. 16 shows an example of the form of same screen display of a trouble message and simulation information on the display of the image monitoring apparatus.

On the image monitoring apparatus 20 side, when determined that the trouble simulation execution instruction was made by a remote operation (Yes in Step P42 in FIG. 14B), the display controller 25, based on an instruction of the CPU 22, displays on the display 28 a trouble message and simulation information as shown in FIG. 16 on the same screen (a simulation information screen 120 with a trouble message)(Step P43 in FIG. 14B). In this simulation information screen 120 with a trouble message, a trouble message stating "Please contact a dealer. Trouble code (F3-12)" as shown in FIG. 16 and the sensor check image 81 that displays the on/off state of tray sensors as simulation information are displayed aligned left-to-right, and the operation panel icon 50 corresponding to the operation unit 17 of the image forming apparatus 10 is displayed. Display of the simulation information screen 120 on the display 28 is continued until the trouble simulation ends (Yes in Step P45 in FIG. 14B).

On the image monitoring apparatus 20 side, when a determination is made that the trouble simulation execution instruction has not been made by a remote operation (No in Step P42 in FIG. 14B), the display controller 25 on the image monitoring apparatus 20 side, based on an instruction of the CPU 22, displays on the display 28 on the image monitoring apparatus 20 side only the simulation information (the simulation information screen 80 shown in FIG. 10) (Step P44 in FIG. 14B). Display of the simulation information screen 80 on the display 28 continues until the trouble simulation ends (Yes in Step P45 in FIG. 14B).

The trouble simulation ends due to an ending operation performed using the operation unit 17 of the image forming apparatus 10 or the operation panel icon 50 displayed on the display 28, or ends due to turning off the power of the image forming apparatus 10.

From the simulation information displayed on the display 28 on the image monitoring apparatus 20 side, the dealer (service staff) is able to confirm the sensor state of the image forming apparatus 10 from a remote location. In the present example, if the tray upper limit detection sensor (CLUD1) is off even though the tray is full of paper, the upper limit detection sensor is determined to be malfunctioning.

The dealer (service staff) can inform the user of the position of the upper limit detection sensor by telephone or the like, and request that the user check whether the sensor is stuck in an off state due to a foreign object or the like. If the sensor is malfunctioning due to a foreign object, the trouble can be resolved by requesting that the user perform the work of removing the foreign object.

After the trouble messages (trouble screens 60 and 70) have been displayed in the display 15 of the image forming apparatus 10 and the display 28 of the image monitoring apparatus 20, when there has been a trouble simulation execution instruction to the image forming apparatus 10 from the image monitoring apparatus 20 (that is, when trouble simulation has been executed by remote operation), in order to allow the user to confirm that trouble is occurring in the image forming apparatus 10 while preventing mistaken operation by the user using the simulation information screen, the display 15 on the image forming apparatus 10 side seen by the user continues display of the trouble message and the remote operation message (the trouble screen 110 with the remote operation message), and does not display a screen (the simulation information screen 82 shown in FIG. 9) corresponding to the simulation information screen 120 displayed in the display 28 of the image monitoring apparatus 20. Therefore, the dealer (service staff) can confirm the state of the image forming apparatus 10 by referring to the simulation information screen 120 displayed in the image monitoring apparatus 20, without confusing the user.

(Screen Display Operation During Jam Trouble)

Next, as a specific example of a case where jam trouble has occurred in the image forming apparatus 10 in the image processing system according to the second embodiment of the present invention, is a description of screen display operation when trouble that can be easily resolved by the user has occurred in the image forming apparatus 10, with reference to the flowcharts shown in FIGS. 11A and 11B and FIGS. 14A and 14B. In the image processing system according to the present embodiment, as in the image processing system according to the above first embodiment, when trouble that can be easily resolved by the user such as jam trouble has occurred, processing waits a fixed time period for trouble to be eliminated, and if the trouble is not eliminated after waiting the fixed time period, the image forming apparatus 10 transmits a trouble occurrence signal to the image monitoring apparatus 20 and starts the above-described trouble processing as shown in the flowcharts in FIGS. 14A and 14B.

That is, on the image forming apparatus 10 side, when occurrence of a jam is detected, jam occurrence processing is started, and the image display controller 14, based on an instruction of the CPU 11, displays on the display 15 the jam occurrence screen 90 as shown in FIG. 12 (Step S30 in FIG. 11A). Next, the image forming apparatus 10 transmits the image data (jam occurrence image) of the jam occurrence screen 90 displayed on the display 15 to the image monitoring apparatus 20 (Step S31 in FIG. 11A). At this time, on the image monitoring apparatus 20 side, when the image data (jam occurrence image) of the jam occurrence screen 90 is received from the image forming apparatus 10, jam occurrence processing is started, and the display controller 25, based on an instruction of the CPU 22, displays on the display 28 the jam occurrence screen 100 as shown in FIG. 13 (Step P30 in FIG. 11B). Displayed in the jam occurrence screen 100 are the image 91 of the jam occurrence screen 90 displayed on the display 15 on the image forming apparatus 10 side, and the operation panel icon 50 that corresponds to the operation unit 17 of the image forming apparatus 10, as shown in FIG. 13.

On the image forming apparatus 10 side, the jam occurrence screen 90 is displayed (Step S30 in FIG. 11A), and when the image data of the displayed jam occurrence screen 90 is transmitted to the image monitoring apparatus 20 (Step S31 in FIG. 11A), the CPU 11 determines whether or not the jam has been eliminated (Step S32 in FIG. 11A), and if the jam has been eliminated (Yes in Step S32 in FIG. 11A), processing returns to the above-described ordinary processing, the display controller 14 displays an ordinary screen on the display 15 (Step S10 in FIG. 3A), and furthermore the image data of the ordinary screen is transmitted via the interface 12 to the image monitoring apparatus 20 (Step S11 in FIG. 3A). Accordingly, on the image monitoring apparatus 20 side, when the image data of the ordinary screen transmitted by the image forming apparatus 10 is received (Yes in Step P31 of FIG. 11B), processing returns to the above-described ordinary processing, a determination is made that the ordinary screen was received (Yes in Step P10 in FIG. 3B), and the display controller 25 displays the ordinary screen on the display 28 (Step P11 in FIG. 3B).

On the other hand, when the jam has not been eliminated (No in Step S32 in FIG. 11A), the CPU 11 on the image forming apparatus 10 side determines whether or not a fixed time period has passed (Step S33 shown in FIG. 11A). When determined that the fixed time period has not passed (No in Step S33 in FIG. 11A), a determination of whether or not the jam has been eliminated is again made (Step S32 in FIG. 11A). That is, the determination of whether or not the jam has been eliminated (Step S32 in FIG. 11A) is repeated until the jam is eliminated (Yes in Step S32 in FIG. 11A) or until the fixed time period has passed (Yes in Step S33 in FIG. 11A). When the fixed time period has passed but the jam has not been eliminated (Yes in Step S33 in FIG. 11A), the CPU 11 on the image forming apparatus 10 side judges that trouble has occurred, starts the above-described trouble processing shown in the flowchart in FIG. 14A, and transmits a trouble occurrence signal via the interface 12 to the image monitoring apparatus 20 (Step S40 in FIG. 14A). Next, the display controller 14 on the image forming apparatus 10 side, based on an instruction of the CPU 11 on the image forming apparatus 10 side, displays a trouble message (trouble screen) on the display 15 on the image forming apparatus 10 side (Step S41 in FIG. 14A).

Here, the trouble occurrence signal includes a trouble code that indicates jam trouble, and image data of the trouble screen 60 displayed on the display 15 on the image forming apparatus 10 side.

On the other hand, on the image monitoring apparatus 20 side, when the trouble occurrence signal (including a jam trouble code, and image data of the trouble screen 60 displayed on the display 15 on the image forming apparatus 10 side) is received from the image forming apparatus 10 via the interface 23, a determination is made not that image data of an ordinary screen was received (No in Step P31 in FIG. 11B), but rather that the trouble occurrence signal was received (Yes in Step P32 in FIG. 11B), the above-described trouble processing shown in the flowchart in FIG. 14B is started, and the display controller 25, based on an instruction of the CPU 22, displays a trouble message (the trouble screen 70 with the operation panel icon 50) on the display 28 on the image monitoring apparatus 20 side (Step P40 in FIG. 14B).

In this state, the dealer (service staff) clicks on the operation panel icon 50 of the trouble screen 70 displayed on the display 28 on the image monitoring apparatus 20 side (that is, performs remote operation), or the service staff operates the operation unit 17 of the image forming apparatus 10 to set the mode of the image forming apparatus 10 to the trouble simulation mode for resolving trouble (that is, instructs execution of trouble simulation).

Also, on the image forming apparatus 10 side, when the trouble message is displayed (Step S41 in FIG. 14A), a determination is made of whether or not execution of trouble simulation has been instructed via the operation panel icon 50 of the trouble screen 70 displayed on the display 28 on the image monitoring apparatus 20 side or via the operation unit 17 of the image forming apparatus 10 (Step S42 in FIG. 14A). When execution of trouble simulation has not been instructed (No in Step S42 in FIG. 14A), processing waits until execution of trouble simulation is instructed. When execution of trouble simulation has been instructed (Yes in Step S42 in FIG. 14A), a determination is made of whether or not that trouble simulation execution instruction was made via the operation panel icon 50 of the trouble screen 70 displayed on the display 28 on the image monitoring apparatus 20 side (that is, whether or not trouble simulation execution was instructed by remote operation)(Step S43 in FIG. 14A).

On the image forming apparatus 10 side, when determined that trouble simulation execution was instructed by remote operation (Yes in Step S43 in FIG. 14A), the display controller 14, based on an instruction of the CPU 11, displays on the display 15 a trouble message and a remote operation message (the trouble screen 110 with a remote operation message) as shown in FIG. 15 (Step S44 in FIG. 14A). After the trouble message and the remote operation message are displayed (Step S44 in FIG. 14A), simulation information corresponding to the remote operation content is transmitted to the image monitoring apparatus 20 (Step S45 in FIG. 14A). Then, processing waits until remote operation from the image monitoring apparatus 20 ends, specifically, until there is an instruction to end trouble simulation from the image monitoring apparatus 20, and when determined that remote operation has ended (Yes in Step S46 in FIG. 14A), display of the remote operation message is ended, so that only the trouble message (the trouble screen 60 as shown in FIG. 8) is displayed on the display 15 (Step S47 shown in FIG. 14A), and display of this trouble message (the trouble screen 60) is continued until power is turned off (Yes in Step S50 shown in FIG. 14A).

On the image forming apparatus 10 side, when determined that trouble simulation execution has not been instructed by remote operation, that is, when determined that trouble simulation execution was instructed via the operation unit 17 of the image forming apparatus 10 (No in Step S43 in FIG. 14A), the display controller 14, based on an instruction of the CPU 11, displays on the display 15 of the image forming apparatus 10 the simulation information (the simulation information screen 82 as shown in FIG. 9) corresponding to the operation content for the operation unit 17 (Step S48 in FIG. 14A). Then, the simulation information displayed on the display 15 is transmitted to the image monitoring apparatus 20 (Step S49 in FIG. 14A), and display of the simulation information is continued until power is turned off (Yes in Step S50 shown in FIG. 14A).

On the other hand, on the image monitoring apparatus 20 side, when the trouble message is displayed (Step P40 in FIG. 14B), by determining whether or not the simulation information was received from the image forming apparatus 10 via the interface 23, a determination is made of whether or not there was an instruction to execute trouble simulation to the image forming apparatus 10 (Step P41 in FIG. 14B). When simulation information has not been received, a determination is made that there has not yet been a trouble simulation execution instruction to the image forming apparatus 10 (No in Step P41 in FIG. 14B), and processing waits until there is a trouble simulation execution instruction to the image forming apparatus 10 (that is, until simulation information is received). On the other hand, when simulation information has been received, a determination is made that there has been a trouble simulation execution instruction to the image forming apparatus 10 (Yes in Step P41 in FIG. 14B), and a determination is made of whether or not this trouble simulation execution instruction was made by an instruction from the image monitoring apparatus 20 (that is, whether or not the trouble simulation execution instruction was made by a remote operation)(Step P42 in FIG. 14B).

On the image monitoring apparatus 20 side, when determined that the trouble simulation execution instruction was made by a remote operation (Yes in Step P42 in FIG. 14B), the display controller 25, based on an instruction of the CPU 22, displays on the display 28 a trouble message and simulation information as shown in FIG. 16 on the same screen (the simulation information screen 120 with a trouble message) (Step P43 in FIG. 14B). In this simulation information screen 120 with a trouble message, a trouble message stating "Please contact a dealer. Trouble code (F3-12)" and the sensor check image 81 that displays the on/off state of tray sensors as simulation information are displayed aligned left-to-right, and the operation panel icon 50 corresponding to the operation unit 17 of the image forming apparatus 10 is displayed, as shown in FIG. 16. Display of the simulation information screen 120 on the display 28 is continued until the trouble simulation ends (Yes in Step P45 in FIG. 14B).

On the image monitoring apparatus 20 side, when a determination is made that the trouble simulation execution instruction has not been made by a remote operation (No in Step P42 in FIG. 14B), the display controller 25 on the image monitoring apparatus 20 side, based on an instruction of the CPU 22, displays on the display 28 on the image monitoring apparatus 20 side only the simulation information (the simulation information screen 80 shown in FIG. 10)(Step P44 in FIG. 14B). Display of the simulation information screen 80 on the display 28 continues until the trouble simulation ends (Yes in Step P45 in FIG. 14B).

Same as in the case where lift-up trouble was detected, after the trouble messages (trouble screens 60 and 70) have been displayed in the display 15 of the image forming apparatus 10 and the display 28 of the image monitoring apparatus 20, when there has been a trouble simulation execution instruction to the image forming apparatus 10 from the image monitoring apparatus 20 (that is, when trouble simulation has been executed by remote operation), in order to allow the user to confirm that trouble is occurring in the image forming apparatus 10 while preventing mistaken operation by the user using the simulation information screen, the display 15 on the image forming apparatus 10 side seen by the user continues display of the trouble message (the trouble screen 60), and does not display a screen (the simulation information screen 82 as shown in FIG. 9) corresponding to the simulation screen 80 displayed in the display 28 of the image monitoring apparatus 20. Therefore, the dealer (service staff) can confirm the state of the image forming apparatus 10 by referring to the simulation information screen 80 displayed on the display 28 of the image monitoring apparatus 20, without confusing the user.

As described above, when a jam has occurred in the image forming apparatus 10, processing waits for passage of a fixed time period after the jam occurrence, and if the jam is not eliminated after passage of the fixed time period, trouble processing is started. The trouble processing when a jam has occurred is the same as the trouble processing when lift-up trouble has occurred. That is, in the image forming system according to the present embodiment, regardless of the type of trouble, the above-described trouble processing shown in the flowchart in FIGS. 14A and 14B is executed. However, the trouble messages (trouble screens 60 and 70) and simulation information (simulation information screens 80 and 82) displayed on the display 15 of the image forming apparatus 10 and the display 28 of the image monitoring apparatus 20 differ depending on the type of trouble. Specifically, various trouble messages and simulation information (simulation information screens) are displayed on the display 15 of the image forming apparatus 10 and the display 28 of the image monitoring apparatus 20 in coordination with a trouble code, or the content of operation via the operation unit 17 or the operation panel icon 50. For example, the simulation information displayed when jam trouble has occurred may indicate the on/off state of sensors disposed in a paper transport path.

<Operation/Effects>

As is clear from the above description, in addition to the same operation effects as the first embodiment, the below operation and effects are obtained according to the present embodiment.

When the image forming apparatus 10 has been remotely operated from the image monitoring apparatus 20 during the occurrence of trouble in the image forming apparatus 10, in addition to a trouble message, a remote operation message is displayed on the display 15 on the image forming apparatus 10 side, so it is possible to prevent the user from mistakenly turning off power of the image forming apparatus 10. On the other hand, simulation information related to the trouble of the image forming apparatus 10, and a trouble message displayed on the display 15 on the image forming apparatus 10 side, are displayed on the display 28 on the image monitoring apparatus 20 side, so with the display 28 of the image monitoring apparatus 20, it is possible to compare the content of the simulation information to the content of the trouble message.

Note that the present invention is not limited to the above embodiments.

In FIGS. 9, 10, and 16, screens in which the on/off state of tray sensors are displayed are shown as examples of the simulation information screens 80, 82, and 120, but the present invention is not limited to such a configuration; a configuration may also be adopted in which the simulation information screen is a screen in which information necessary for analyzing trouble is displayed, or a screen that enables a response to trouble (for example, such as allowing changing of operating environment settings such as fixing temperature of the image forming apparatus 10, or allowing operation of a paper transport roller). For example, in the case of the above jam trouble, a screen in which the on/off state of sensors disposed in a paper transport path is displayed may be displayed as a simulation information screen. Also, in the case of trouble in which a sensor for image quality adjustment does not enter an adjustment range, an adjustment value modification screen for modifying the adjustment range such that it is possible to avoid trouble by temporarily increasing the adjustment value range may be displayed as a simulation information screen. In this case as well, on the display 15 of the image forming apparatus 10 that has been remotely operated from the image monitoring apparatus 20, a trouble message is displayed, but a simulation information screen (adjustment value modification screen) is not displayed, so there is no concern that the user will mistakenly modify adjustment values via the operation unit 17 of the image forming apparatus 10. Thus, in a state in which the trouble message has been displayed on the display 15 of the image forming apparatus 10, it is possible to remotely operate the image forming apparatus 10 from the image monitoring apparatus 20, so the dealer (service staff), while having the user identify that trouble is occurring in the image forming apparatus 10, can confirm the operational state of the image forming apparatus 10 by referring to the simulation screen displayed on the display 28 of the image monitoring apparatus 20. Thus, it is possible to prompt the user to perform a trouble resolving operation or to cause the user to perform such an operation, and possible to temporarily resolve trouble remotely. Also, the service staff of the dealer can travel to the user site after becoming aware of the operational state of the image forming apparatus 10, so the time until trouble is resolved can be shortened.

Also, in the trouble processing on the image forming apparatus 10 side, shown in the flowcharts in FIGS. 6A and 14A, the trouble processing is ended by turning off power (Yes in Step S26 in FIG. 6A, Yes in Step S50 in FIG. 14A), but the present invention is not limited to such a configuration. For example, a configuration may also be adopted in which the trouble processing is ended by ending of the trouble simulation or elimination of the trouble, and then processing returns to the ordinary processing shown in the flowchart in FIG. 3A.

Also, in the above second embodiment, the display 15 of the image forming apparatus 10, as shown in FIG. 15, displays the remote operation message on the same screen as the screen displayed the trouble message (that is, the trouble screen 110 with the remote operation message), but the present invention is not limited to such a configuration. A configuration may also be adopted in which the display 15 of the image forming apparatus 10 displays the remote operation message on a different screen from the screen displayed the trouble message. Similarly, the display 28 of the image monitoring apparatus 20, as shown in FIG. 16, displays the simulation information on the same screen as the screen displayed the trouble message (that is, the simulation information screen 120 with the trouble message), but the present invention is not limited to such a configuration. A configuration may also be adopted in which the display 28 of the image monitoring apparatus 20 displays the simulation information on a different screen from the screen displayed the trouble message.

Of course, various other design changes and revisions within the range of the claims appended to this specification can be added.

More specifically, the present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

REFERENCE SIGNS LIST

10 image forming apparatus (image processing apparatus)
11 CPU
12 interface
13 display memory
14 display controller
15 display
16 program memory
17 operation unit
20 image monitoring apparatus
21 image monitoring apparatus main body
22 CPU
23 interface
24 display memory
25 display controller
26 program memory
28 display
30 ordinary screen on image forming apparatus side
31 image of ordinary screen
40 ordinary screen on image monitoring apparatus side
50 operation panel icon
50 trouble screen on image forming apparatus side
61 image of trouble screen
70 trouble screen on image monitoring apparatus side
80 simulation information screen on image monitoring apparatus side
81 image of simulation information screen
82 simulation information screen on image forming apparatus side
90 jam occurrence screen on image forming apparatus side
91 image of jam occurrence screen
100 jam occurrence screen on image monitoring apparatus side
110 trouble screen with remote operation message
120 simulation information screen with trouble message

What is claimed is:

1. An image processing apparatus that is communicably connected to an image monitoring apparatus having a display unit, and can be remotely operated from the image monitoring apparatus, the image processing apparatus comprising:
    a display unit that is configured so that display content can be synchronized with the display unit of the image monitoring apparatus, and displays a trouble message informing that trouble has occurred when trouble occurs in the image processing apparatus,
    wherein when remote operation is performed from the image monitoring apparatus while the display unit of the image processing apparatus is displaying the trouble message, simulation information related to the trouble corresponding to the content of the remote operation is transmitted to the image monitoring apparatus such that the simulation information is displayed only on the display unit of the image monitoring apparatus, and display of the trouble message on the display unit of the image processing apparatus is continued.

2. The image processing apparatus according to claim 1,
    wherein when remote operation is performed from the image monitoring apparatus while the display unit of the image processing apparatus is displaying the trouble message, the display unit of the image processing apparatus displays the trouble message and a remote operation message informing that remote operation is being performed.

3. The image processing apparatus according to claim 1,
    wherein when execution of trouble simulation for resolving a trouble is instructed while the display unit of the image processing apparatus is displaying the trouble message, a determination is made of whether or not the trouble simulation execution was instructed by the remote operation from the image monitoring apparatus,
    wherein when determined that the trouble simulation execution was instructed by the remote operation, the simulation information related to the trouble corresponding to the content of the remote operation is transmitted to the image monitoring apparatus such that the simulation information is displayed only on the display unit of the image monitoring apparatus, and the display of the trouble message on the display unit of the image processing apparatus is continued, and
    wherein when determined that the trouble simulation execution was not instructed by the remote operation, simulation information corresponding to the content of operation in the image processing apparatus is displayed on the display unit of the image processing apparatus, and the simulation information is transmitted to the image monitoring apparatus.

4. An image processing system comprising an image processing apparatus and an image monitoring apparatus that is communicably connected to the image processing apparatus, in which the image processing apparatus can be remotely operated from the image monitoring apparatus;
    the image processing apparatus including a display unit that displays a trouble message informing that trouble has occurred when trouble occurs; and
    the image monitoring apparatus including a display unit that is configured so that display content can be synchronized with the display unit of the image processing apparatus, and when trouble occurs in the image processing apparatus, displays a trouble message having the same content as the trouble message displayed by the display unit of the image processing apparatus, wherein when the image processing apparatus is remotely operated from the image monitoring apparatus while the display units of the image processing apparatus and the image monitoring apparatus are displaying the trouble messages, simulation information related to the trouble corresponding to the content of the remote operation is displayed only on the display unit of the image monitoring apparatus, and display of the trouble message on the display unit of the image processing apparatus is continued.

5. The image processing system according to claim 4, wherein when the image processing apparatus is remotely operated from the image monitoring apparatus while the display unit of the image processing apparatus is displaying the trouble message, the display unit of the image processing apparatus displays the trouble message and a remote operation message informing that remote operation is being performed.

6. The image processing system according to claim 5, wherein when the image processing apparatus is remotely operated from the image monitoring apparatus while the display unit of the image monitoring apparatus is displaying the trouble message, the display unit of the image monitoring apparatus displays the simulation information and the trouble message.

7. The image processing system according to claim 4, wherein when the image processing apparatus is remotely operated from the image monitoring apparatus while the display unit of the image monitoring apparatus is displaying the trouble message, the display unit of the image monitoring apparatus displays the simulation information and the trouble message.

8. The image processing system according to claim 4, wherein when execution of trouble simulation for resolving a trouble is instructed from the image processing apparatus remotely operated by the image monitoring apparatus while the display units of the image processing apparatus and the image monitoring apparatus are displaying the trouble messages, the simulation information related to the trouble corresponding to the content of the remote operation is displayed only on the display unit of the image monitoring apparatus, and the display of the trouble message on the display unit of the image processing apparatus is continued, and wherein when the execution of the trouble simulation is instructed from the image processing apparatus without being remotely operated by the image monitoring apparatus while the display units of the image processing apparatus and the image monitoring apparatus are displaying the trouble messages, simulation information corresponding to the content of operation in the image processing apparatus is displayed on both display units of the image processing apparatus and the image monitoring apparatus.

* * * * *